US012003806B2

(12) United States Patent
Jayaram et al.

(10) Patent No.: US 12,003,806 B2
(45) Date of Patent: Jun. 4, 2024

(54) AUGMENTED REALITY SYSTEM FOR VIEWING AN EVENT WITH MULTIPLE COORDINATE SYSTEMS AND AUTOMATICALLY GENERATED MODEL

(71) Applicant: Quintar, Inc., Santa Clara, CA (US)

(72) Inventors: Sankar Jayaram, Los Gatos, CA (US); Wayne O. Cochran, Ridgefield, WA (US); John Harrison, Hillsboro, OR (US); Timothy P. Heidmann, Los Altos, CA (US); John Buddy Scott, Lawrenceville, GA (US)

(73) Assignee: Quintar, Inc., Santa Clara, CA (US)

( * ) Notice: Subject to any disclaimer, the term of this patent is extended or adjusted under 35 U.S.C. 154(b) by 0 days.

(21) Appl. No.: 17/242,265

(22) Filed: Apr. 27, 2021

(65) Prior Publication Data

US 2022/0295139 A1 Sep. 15, 2022

Related U.S. Application Data

(60) Provisional application No. 63/159,870, filed on Mar. 11, 2021.

(51) Int. Cl.
*H04N 21/431* (2011.01)
*G06T 19/00* (2011.01)
*H04N 13/117* (2018.01)
*H04N 13/178* (2018.01)
*H04N 13/183* (2018.01)
(Continued)

(52) U.S. Cl.
CPC ....... *H04N 21/4316* (2013.01); *G06T 19/006* (2013.01); *H04N 13/117* (2018.05); *H04N 13/178* (2018.05); *H04N 13/183* (2018.05); *H04N 13/194* (2018.05); *H04N 21/2187* (2013.01)

(58) Field of Classification Search
CPC ............ H04N 21/4316; H04N 13/117; H04N 13/178; H04N 13/194; H04N 13/183; H04N 21/2187; G06T 19/006
See application file for complete search history.

(56) References Cited

U.S. PATENT DOCUMENTS 5,742,521 A * 4/1998 Ellenby ................. G06F 3/0346
702/127
5,850,352 A * 12/1998 Moezzi ................ H04N 13/246
348/E13.058

(Continued)

FOREIGN PATENT DOCUMENTS

WO WO2015/192117 A1 12/2015

OTHER PUBLICATIONS

U.S. Appl. No. 17/519,121, filed Nov. 4, 2021.

(Continued)

*Primary Examiner* — Charles L Beard
(74) *Attorney, Agent, or Firm* — Vierra Magen Marcus LLP

(57) ABSTRACT

Augmented reality systems provide graphics over views from a mobile device for both in-venue and remote viewing of a sporting or other event. A server system can provide a transformation between the coordinate system of a mobile device (smart phone, tablet computer, head mounted display) and a real world coordinate system. Requested graphics for the event are displayed over a view of an event.

18 Claims, 24 Drawing Sheets

(51) Int. Cl.
*H04N 13/194* (2018.01)
*H04N 21/2187* (2011.01)

(56) References Cited

U.S. PATENT DOCUMENTS

| | | | | |
|---|---|---|---|---|
| 5,862,517 | A * | 1/1999 | Honey | G06T 7/70 |
| | | | | 702/92 |
| 5,912,700 | A * | 6/1999 | Honey | H04N 7/088 |
| | | | | 348/157 |
| 7,796,155 | B1 * | 9/2010 | Neely, III | G06V 20/52 |
| | | | | 348/157 |
| 8,016,653 | B2 * | 9/2011 | Pendleton | A63F 13/45 |
| | | | | 463/31 |
| 8,036,678 | B2 * | 10/2011 | Goldenberg | G06F 16/9537 |
| | | | | 701/28 |
| 8,077,981 | B2 | 12/2011 | Elangovan et al. | |
| 8,253,799 | B2 | 8/2012 | Elangovan et al. | |
| 8,451,265 | B2 * | 5/2013 | Gloudemans | G06T 15/20 |
| | | | | 345/473 |
| 8,499,038 | B1 | 7/2013 | Vucurevich | |
| 8,956,227 | B2 * | 2/2015 | Suzuki | A63F 13/5258 |
| | | | | 463/31 |
| 9,094,615 | B2 * | 7/2015 | Aman | G06T 19/006 |
| 9,215,383 | B2 | 12/2015 | Milnes et al. | |
| 9,285,871 | B2 * | 3/2016 | Geisner | G06F 3/013 |
| 9,286,711 | B2 * | 3/2016 | Geisner | G06F 15/00 |
| 9,323,325 | B2 | 4/2016 | Perez et al. | |
| 9,619,943 | B2 * | 4/2017 | Perez | G06F 3/012 |
| 9,696,547 | B2 * | 7/2017 | Kinnebrew | G06F 3/011 |
| 9,906,769 | B1 * | 2/2018 | Young | H04N 23/90 |
| 9,928,652 | B2 | 3/2018 | Nicholas et al. | |
| 10,102,654 | B1 * | 10/2018 | Philips | G06T 11/206 |
| 10,142,777 | B1 * | 11/2018 | Wulff | H04W 4/021 |
| 10,169,917 | B2 | 1/2019 | Chen et al. | |
| 10,356,393 | B1 * | 7/2019 | Binns | H04N 13/117 |
| 10,360,713 | B1 * | 7/2019 | Arana | G06T 11/60 |
| 10,380,410 | B2 | 8/2019 | Gold et al. | |
| 10,419,716 | B1 * | 9/2019 | Tanumihardja | A63F 13/5252 |
| 10,430,994 | B1 * | 10/2019 | Baker | G06T 7/55 |
| 10,478,717 | B2 | 11/2019 | Robbins et al. | |
| 10,484,824 | B1 * | 11/2019 | Gaeta | H04W 4/026 |
| 10,573,018 | B2 * | 2/2020 | Kutliroff | G06T 7/50 |
| 10,834,305 | B2 * | 11/2020 | Linderoth | H04N 23/695 |
| 10,839,557 | B1 * | 11/2020 | Arora | G06T 19/006 |
| 10,979,773 | B2 * | 4/2021 | Mun | H04N 21/23418 |
| 11,043,038 | B1 * | 6/2021 | Ngai | G06T 7/246 |
| 11,087,479 | B1 * | 8/2021 | Geraghty | G06T 19/006 |
| 11,090,569 | B1 * | 8/2021 | Wu | A63F 13/67 |
| 11,164,289 | B1 * | 11/2021 | Yang | G06N 20/00 |
| 11,224,804 | B2 * | 1/2022 | Pavlov | A63F 13/87 |
| 11,228,790 | B2 * | 1/2022 | Shin | H04N 21/21805 |
| 11,252,329 | B1 * | 2/2022 | Cier | H04N 23/53 |
| 11,282,279 | B2 * | 3/2022 | Kurabayashi | G06T 19/006 |
| 11,282,287 | B2 * | 3/2022 | Gausebeck | G06T 17/00 |
| 11,283,983 | B2 * | 3/2022 | Linderoth | H04N 21/21805 |
| 11,417,069 | B1 * | 8/2022 | Gupta | G06V 20/70 |
| 11,463,738 | B2 * | 10/2022 | Makinen | H04N 21/21805 |
| 2007/0110338 | A1 | 5/2007 | Snavely et al. | |
| 2008/0178232 | A1 * | 7/2008 | Velusamy | H04N 23/66 |
| | | | | 725/87 |
| 2009/0010507 | A1 * | 1/2009 | Geng | G06T 7/593 |
| | | | | 382/128 |
| 2009/0128548 | A1 * | 5/2009 | Gloudemans | G06T 5/77 |
| | | | | 382/103 |
| 2009/0167787 | A1 * | 7/2009 | Bathiche | G06T 19/006 |
| | | | | 345/633 |
| 2010/0245387 | A1 * | 9/2010 | Bachelder | G06T 19/006 |
| | | | | 345/633 |
| 2010/0257252 | A1 | 10/2010 | Dougherty et al. | |
| 2011/0025853 | A1 * | 2/2011 | Richardson | H04N 23/66 |
| | | | | 348/E7.085 |
| 2011/0052083 | A1 * | 3/2011 | Rekimoto | H04N 1/00307 |
| | | | | 382/218 |
| 2011/0157223 | A1 | 6/2011 | John et al. | |
| 2012/0004956 | A1 * | 1/2012 | Huston | G06Q 30/0241 |
| | | | | 705/14.1 |
| 2012/0033077 | A1 * | 2/2012 | Kitaura | G06T 7/55 |
| | | | | 348/148 |
| 2012/0098925 | A1 * | 4/2012 | Dasher | H04N 21/234 |
| | | | | 348/E7.001 |
| 2012/0120201 | A1 * | 5/2012 | Ward | A63F 13/213 |
| | | | | 348/47 |
| 2012/0249831 | A1 * | 10/2012 | Porter | H04N 23/695 |
| | | | | 348/222.1 |
| 2013/0083173 | A1 * | 4/2013 | Geisner | G06T 19/006 |
| | | | | 348/51 |
| 2013/0148861 | A1 * | 6/2013 | Ferlatte | G06V 20/42 |
| | | | | 382/107 |
| 2013/0259447 | A1 * | 10/2013 | Sathish | G11B 27/105 |
| | | | | 386/278 |
| 2014/0058801 | A1 * | 2/2014 | Deodhar | G06Q 10/0639 |
| | | | | 705/7.38 |
| 2014/0118512 | A1 * | 5/2014 | Park | H04N 13/366 |
| | | | | 348/54 |
| 2014/0184749 | A1 * | 7/2014 | Hilliges | G06T 19/006 |
| | | | | 348/47 |
| 2014/0247279 | A1 | 9/2014 | Nicholas et al. | |
| 2014/0267234 | A1 * | 9/2014 | Hook | G06T 19/006 |
| | | | | 345/419 |
| 2014/0300775 | A1 * | 10/2014 | Fan | H04N 1/32128 |
| | | | | 348/222.1 |
| 2015/0026718 | A1 * | 1/2015 | Seyller | H04N 21/854 |
| | | | | 725/34 |
| 2015/0062123 | A1 * | 3/2015 | Yuen | G06T 19/20 |
| | | | | 345/420 |
| 2015/0123966 | A1 * | 5/2015 | Newman | G06T 19/006 |
| | | | | 345/419 |
| 2015/0138188 | A1 * | 5/2015 | Gillard | G06T 15/00 |
| | | | | 345/419 |
| 2015/0222935 | A1 * | 8/2015 | King | H04N 21/8549 |
| | | | | 348/48 |
| 2015/0248917 | A1 * | 9/2015 | Chang | G11B 27/031 |
| | | | | 386/282 |
| 2015/0264258 | A1 * | 9/2015 | Bervoets | H04N 5/222 |
| | | | | 348/36 |
| 2015/0310671 | A1 * | 10/2015 | Kim | G06F 3/04842 |
| | | | | 345/633 |
| 2015/0317821 | A1 * | 11/2015 | Ding | G06T 7/60 |
| | | | | 345/420 |
| 2015/0347827 | A1 * | 12/2015 | Dickinson | H04N 21/4788 |
| | | | | 382/103 |
| 2015/0356787 | A1 * | 12/2015 | Abe | G06F 3/04815 |
| | | | | 345/633 |
| 2015/0356788 | A1 * | 12/2015 | Abe | A63F 13/335 |
| | | | | 345/633 |
| 2016/0012643 | A1 * | 1/2016 | Kezele | H04N 13/344 |
| | | | | 345/633 |
| 2016/0026253 | A1 * | 1/2016 | Bradski | H04N 13/128 |
| | | | | 345/8 |
| 2016/0071325 | A1 * | 3/2016 | Callaghan | A61M 5/20 |
| | | | | 345/633 |
| 2016/0093058 | A1 * | 3/2016 | Moteki | G06T 7/73 |
| | | | | 382/154 |
| 2016/0148433 | A1 * | 5/2016 | Petrovskaya | G02B 27/01 |
| | | | | 345/633 |
| 2016/0210783 | A1 * | 7/2016 | Tomlin | G02B 27/017 |
| 2016/0320951 | A1 * | 11/2016 | Ernst | G06T 5/00 |
| 2016/0358382 | A1 * | 12/2016 | Lee | H04N 13/363 |
| 2017/0026680 | A1 * | 1/2017 | Sugio | H04N 21/2187 |
| 2017/0124769 | A1 * | 5/2017 | Saito | H04N 23/698 |
| 2017/0193693 | A1 * | 7/2017 | Robert | G01B 11/24 |
| 2017/0236331 | A1 * | 8/2017 | Bryson | G06T 19/006 |
| | | | | 345/633 |
| 2017/0243403 | A1 | 8/2017 | Daniels et al. | |
| 2017/0358141 | A1 * | 12/2017 | Stafford | G06T 7/246 |
| 2017/0358142 | A1 * | 12/2017 | Lee | H04W 4/026 |
| 2017/0358175 | A1 * | 12/2017 | Zimmerman | A63F 13/2145 |
| 2017/0365102 | A1 | 12/2017 | Huston et al. | |
| 2018/0048810 | A1 * | 2/2018 | Matsushita | H04N 13/243 |
| 2018/0054659 | A1 * | 2/2018 | Goswami | H04N 13/243 |

(56) References Cited

U.S. PATENT DOCUMENTS

| | | | |
|---|---|---|---|
| 2018/0108172 A1 | 4/2018 | Huston et al. | |
| 2018/0227572 A1* | 8/2018 | King | H04N 23/90 |
| 2018/0239425 A1* | 8/2018 | Jang | G06F 3/015 |
| 2018/0270427 A1* | 9/2018 | Damstra | H04N 21/2805 |
| 2018/0285052 A1* | 10/2018 | Eade | G03H 1/0005 |
| 2018/0295389 A1* | 10/2018 | Kakurai | H04N 21/8146 |
| 2018/0300916 A1* | 10/2018 | Barnett | G06Q 10/10 |
| 2018/0300917 A1* | 10/2018 | Barnett | H04W 4/02 |
| 2018/0318709 A1* | 11/2018 | Metelko | G06T 15/20 |
| 2018/0343442 A1* | 11/2018 | Yoshikawa | H04N 21/438 |
| 2018/0350406 A1* | 12/2018 | Lodato | G11B 27/036 |
| 2018/0376217 A1* | 12/2018 | Kahng | H04N 21/41407 |
| 2019/0007750 A1* | 1/2019 | Tillman, Jr. | G06F 3/011 |
| 2019/0026922 A1* | 1/2019 | Kellogg | G06T 7/246 |
| 2019/0026948 A1* | 1/2019 | Kellogg | G06T 19/006 |
| 2019/0026958 A1* | 1/2019 | Gausebeck | H04N 13/10 |
| 2019/0045253 A1* | 2/2019 | Meredith | H04N 21/2668 |
| 2019/0051051 A1* | 2/2019 | Kaufman | G09B 9/06 |
| 2019/0073831 A1* | 3/2019 | Kim | G06F 3/011 |
| 2019/0073832 A1* | 3/2019 | Kim | G06T 19/003 |
| 2019/0088004 A1* | 3/2019 | Lucas | G06T 19/20 |
| 2019/0099678 A1* | 4/2019 | Khan | A63F 13/44 |
| 2019/0102939 A1* | 4/2019 | He | A63F 13/65 |
| 2019/0102941 A1* | 4/2019 | Khan | H04N 13/243 |
| 2019/0104235 A1* | 4/2019 | Sarkar | H04N 21/47 |
| 2019/0105568 A1* | 4/2019 | Platt | A63F 13/52 |
| 2019/0108683 A1* | 4/2019 | Valli | G06T 19/003 |
| 2019/0114832 A1* | 4/2019 | Park | G06T 7/579 |
| 2019/0128670 A1* | 5/2019 | Chen | G01C 11/025 |
| 2019/0139321 A1* | 5/2019 | Kocharlakota | G06T 19/20 |
| 2019/0158813 A1* | 5/2019 | Rowell | H04N 13/111 |
| 2019/0180499 A1* | 6/2019 | Caulfield | G06V 20/17 |
| 2019/0197789 A1* | 6/2019 | Macauley | G06T 19/006 |
| 2019/0199997 A1* | 6/2019 | Mizuno | G06T 7/70 |
| 2019/0213423 A1* | 7/2019 | Haberstroh | H04N 21/41407 |
| 2019/0222776 A1* | 7/2019 | Carter | H04N 5/272 |
| 2019/0311471 A1* | 10/2019 | Kurabayashi | G06T 7/0002 |
| 2019/0313133 A1* | 10/2019 | McSchooler | H04N 21/2187 |
| 2019/0321683 A1* | 10/2019 | Yerli | H04N 21/21805 |
| 2019/0362559 A1* | 11/2019 | Dai | G06T 19/006 |
| 2019/0371030 A1* | 12/2019 | Roesler | G06F 3/04845 |
| 2019/0373293 A1* | 12/2019 | Bortman | H04N 19/59 |
| 2020/0013222 A1 | 1/2020 | Fergie et al. | |
| 2020/0027314 A1* | 1/2020 | Pilnock | G07F 17/3223 |
| 2020/0034989 A1* | 1/2020 | Koyama | H04N 13/246 |
| 2020/0043235 A1* | 2/2020 | Chapman | G06T 19/006 |
| 2020/0108316 A1* | 4/2020 | Nay | A63F 13/61 |
| 2020/0111267 A1* | 4/2020 | Stauber | G06F 3/011 |
| 2020/0118342 A1* | 4/2020 | Varshney | G06T 13/20 |
| 2020/0126257 A1* | 4/2020 | Tauber | G06T 7/75 |
| 2020/0133618 A1* | 4/2020 | Kim | G06F 3/147 |
| 2020/0147489 A1* | 5/2020 | Mahlmeister | A63F 13/77 |
| 2020/0159313 A1 | 5/2020 | Gibby et al. | |
| 2020/0177928 A1* | 6/2020 | Shin | H04N 21/816 |
| 2020/0193708 A1* | 6/2020 | Maggiore | H04W 4/029 |
| 2020/0226774 A1* | 7/2020 | Kaino | G06F 3/01 |
| 2020/0236406 A1* | 7/2020 | Bastian | H04N 21/234 |
| 2020/0280758 A1* | 9/2020 | O'Rourkes | H04L 67/104 |
| 2020/0288119 A1* | 9/2020 | Iwakiri | H04N 7/181 |
| 2020/0302510 A1 | 9/2020 | Chachek et al. | |
| 2020/0310630 A1* | 10/2020 | Ernst | G06T 7/292 |
| 2020/0319702 A1* | 10/2020 | Perkins | H04N 21/4223 |
| 2020/0320794 A1* | 10/2020 | Huang | G06F 3/013 |
| 2020/0321099 A1 | 10/2020 | Holladay et al. | |
| 2020/0349350 A1 | 11/2020 | Toh et al. | |
| 2020/0357165 A1* | 11/2020 | Dixit | G06T 19/006 |
| 2020/0368619 A1* | 11/2020 | Yeung | G06F 3/011 |
| 2020/0372672 A1* | 11/2020 | Schonberger | G06T 7/74 |
| 2020/0374498 A1* | 11/2020 | Sodhi | H04N 9/3176 |
| 2020/0380779 A1* | 12/2020 | Khazov | G06T 17/20 |
| 2020/0404218 A1* | 12/2020 | Yerli | G06F 9/453 |
| 2021/0006766 A1* | 1/2021 | Yea | H04N 19/176 |
| 2021/0006840 A1* | 1/2021 | Vosoughi | H04N 19/176 |
| 2021/0027524 A1* | 1/2021 | Moss | G06V 10/751 |
| 2021/0097667 A1* | 4/2021 | Barua | G06V 40/18 |
| 2021/0104102 A1* | 4/2021 | Cavallo | G06T 15/40 |
| 2021/0112238 A1* | 4/2021 | Bylicka | G06T 7/292 |
| 2021/0133929 A1* | 5/2021 | Ackerson | G06T 3/4092 |
| 2021/0142508 A1 | 5/2021 | Azimi et al. | |
| 2021/0150755 A1* | 5/2021 | Gao | G06T 7/73 |
| 2021/0152808 A1* | 5/2021 | He | H04N 13/178 |
| 2021/0158552 A1* | 5/2021 | Berger | G06T 7/586 |
| 2021/0160549 A1* | 5/2021 | Makinen | H04N 21/44008 |
| 2021/0201437 A1* | 7/2021 | Yerli | G06T 17/005 |
| 2021/0209777 A1* | 7/2021 | Zhao | B64C 39/024 |
| 2021/0225017 A1* | 7/2021 | Holzer | G06T 7/38 |
| 2021/0241534 A1 | 8/2021 | Avisar et al. | |
| 2021/0248814 A1* | 8/2021 | Tao | G06T 17/00 |
| 2021/0264664 A1* | 8/2021 | Saracchini | H04N 5/232939 |
| 2021/0272359 A1* | 9/2021 | Michielin | G06T 17/20 |
| 2021/0279950 A1* | 9/2021 | Phalak | G06T 7/55 |
| 2021/0279953 A1* | 9/2021 | Bouhnik | G06T 17/05 |
| 2021/0279967 A1* | 9/2021 | Gernoth | G06F 9/453 |
| 2021/0304490 A1* | 9/2021 | Kaplan | G06T 15/205 |
| 2021/0377613 A1* | 12/2021 | Sims | H04N 21/47815 |
| 2021/0377616 A1* | 12/2021 | Behagen | H04N 21/2365 |
| 2021/0385423 A1* | 12/2021 | Oh | H04N 19/597 |
| 2022/0007082 A1* | 1/2022 | Okuda | G06T 13/20 |
| 2022/0036118 A1* | 2/2022 | Gupta | G06V 10/145 |
| 2022/0051431 A1* | 2/2022 | Jagadeesan | H04N 13/204 |
| 2022/0053245 A1* | 2/2022 | Guez | H04N 21/4126 |
| 2022/0068038 A1* | 3/2022 | Tauber | G06T 19/20 |
| 2022/0092802 A1* | 3/2022 | Jang | G06T 7/80 |
| 2022/0107977 A1* | 4/2022 | Marthouse | G06N 3/08 |
| 2022/0108481 A1* | 4/2022 | Lopes De Queiroz | G06T 9/007 |
| 2022/0108536 A1* | 4/2022 | Jung | G06T 19/20 |
| 2022/0122326 A1* | 4/2022 | Reitmayr | H04N 23/698 |
| 2022/0130145 A1* | 4/2022 | Connary | G06V 20/10 |
| 2022/0156426 A1* | 5/2022 | Hampali | G06T 17/20 |
| 2022/0157014 A1* | 5/2022 | Sevastopolskiy | G06T 15/60 |
| 2022/0164988 A1* | 5/2022 | Dotsenko | G06T 7/55 |
| 2022/0172429 A1* | 6/2022 | Tong | G06T 7/55 |
| 2022/0230398 A1* | 7/2022 | Peri | G06T 19/006 |
| 2022/0239945 A1* | 7/2022 | Oh | H04N 19/30 |
| 2022/0262142 A1* | 8/2022 | Li | G06V 20/42 |
| 2022/0270323 A1* | 8/2022 | Meléndez | G06T 7/593 |
| 2022/0272133 A1* | 8/2022 | Jeon | H04N 21/816 |
| 2022/0277516 A1* | 9/2022 | Matsunobu | G06T 19/00 |
| 2022/0292783 A1* | 9/2022 | Jayaram | G06T 7/33 |
| 2022/0292784 A1* | 9/2022 | Jayaram | H04N 23/90 |
| 2022/0292785 A1* | 9/2022 | Jayaram | G06F 3/012 |
| 2022/0295032 A1* | 9/2022 | Jayaram | G06V 20/20 |
| 2022/0295040 A1* | 9/2022 | Jayaram | G06T 7/579 |
| 2022/0295141 A1* | 9/2022 | Jayaram | H04N 21/41407 |
| 2022/0319119 A1* | 10/2022 | Bhogale | G06Q 10/083 |
| 2022/0358727 A1* | 11/2022 | Gupta | G06T 19/006 |
| 2022/0375110 A1* | 11/2022 | Evangelidis | G06T 7/50 |
| 2022/0391618 A1* | 12/2022 | Moton, Jr. | G06F 16/9035 |
| 2023/0013988 A1* | 1/2023 | Kalathuru | G06V 20/42 |
| 2023/0063505 A1* | 3/2023 | Chastain | G06F 3/011 |
| 2023/0185365 A1* | 6/2023 | Rahman | G06T 19/006 345/156 |
| 2023/0196691 A1* | 6/2023 | Madden | A63F 13/35 345/633 |
| 2023/0199231 A1* | 6/2023 | Fredette | H04N 21/21805 725/105 |
| 2023/0252782 A1* | 8/2023 | Chastain | G06F 3/04815 345/633 |
| 2023/0260219 A1* | 8/2023 | Doken | H04N 21/23418 345/633 |
| 2023/0290061 A1* | 9/2023 | Kumar Kamaraju | G06T 7/579 |
| 2023/0298260 A1* | 9/2023 | Ogura | G06T 7/70 345/427 |
| 2023/0359268 A1* | 11/2023 | Letkeman | G06F 3/0488 |

OTHER PUBLICATIONS

U.S. Appl. No. 17/519,128, filed Nov. 4, 2021.
U.S. Appl. No. 17/519,133, filed Nov. 4, 2021.
HOLE19 Golf, "Hole19's Brand-New Augmented Reality (AR) Feature Brings the Golf Course to Life," [https://www.prnewswire.

(56) References Cited

OTHER PUBLICATIONS com/news-releases/hole19s-brand-new-augmented-reality-ar-feature-brings-the-golf-course-to-life-300754810.html], Nov. 23, 2018, 2 pages.
"Tutorial," COLMAP 3.7 documentation, [https://colmap/github.io/tutorial.html], downloaded on Feb. 14, 2021, 14 pages.
Takacs, Gabriel, et al., "Outdoors Augmented Reality on Mobile Phone using Loxel-Based Visual Feature Organization," MIR '08, Oct. 30-31, 2008, 8 pages.
Stanley, Adam, "PGA Tour announces innovative new AR app," PGA Tour, [https://www.pgatour.com/news/2018/03/12/pga-tour-innovative-augmented reality-app.html], Mar. 12, 2018, 9 pages.
Altstadter, Jeff, "USGA, Deloitte Launch 2020 U.S. Open Augmented Reality App," [https://www.usopen.com/2020/articles/usga-deloitte-launch-2020-u-s-open-augmented reality-app.html], Sep. 10, 2020, 4 pages.
Umeyama, Shinji, "Least-squares Estimation of Transformation Parameters Between Two Point Patterns," IEEE Transactions on Pattern Analysis and Machine Intelligence, vol. 12, No. 4, Apr. 1991, 5 pages.
U.S. Appl. No. 17/242,267, filed Apr. 27, 2021.
U.S. Appl. No. 17/242,270, filed Apr. 27, 2021.
U.S. Appl. No. 17/242,275, filed Apr. 27, 2021.
Response to Office Action dated Dec. 14, 2021, U.S. Appl. No. 17/242,275, filed Apr. 27, 2021.
Non-final Office Action dated Sep. 16, 2021, U.S. Appl. No. 17/242,275, filed Apr. 27, 2021.
International Search Report & The Written Opinion of the International Searching Authority dated Jul. 22, 2022, International Application No. PCT/US2022/019226.
Non-final Office Action dated Jul. 20, 2022, U.S. Appl. No. 17/242,270, filed Apr. 27, 2021.
Response to Office Action dated Aug. 25, 2022, U.S. Appl. No. 17/242,270, filed Apr. 27, 2021.
Non-final Office Action dated Aug. 31, 2022, U.S. Appl. No. 17/242,275, filed Apr. 27, 2021.
Notice of Allowance dated Sep. 21, 2022, U.S. Appl. No. 17/242,270, filed Apr. 27, 2021.
International Search Report & The Written Opinion of the International Searching Authority dated Jul. 7, 2022, International Application No. PCT/US2022/018661.
International Search Report & The Written Opinion of the International Searching Authority dated Jul. 15, 2022, International Application No. PCT/US2022/018665.
International Search Report & The Written Opinion of the International Searching Authority dated Jul. 13, 2022, International Application No. PCT/US2022/018668.
International Search Report & The Written Opinion of the International Searching Authority dated Jul. 13, 2022, International Application No. PCT/US2022/018674.
Final Office Action dated Aug. 8, 2022, U.S. Appl. No. 17/242,267, filed Apr. 27, 2021.
Final Office Action dated Mar. 18, 2022, U.S. Appl. No. 17/242,275, filed Apr. 27, 2021.
Non-final Office Action dated Mar. 18, 2022, U.S. Appl. No. 17/242,267, filed Apr. 27, 2021.
Response to Office Action dated Jun. 16, 2022, U.S. Appl. No. 17/242,267, filed Apr. 27, 2021.
Response to Office Action dated Jun. 21, 2022, U.S. Appl. No. 17/242,275, filed Apr. 27, 2021.
Notice of Allowance dated Oct. 13, 2022, U.S. Appl. No. 17/242,270, filed Apr. 27, 2021.
Response to Office Action dated Nov. 7, 2022, U.S. Appl. No. 17/242,267, filed Apr. 27, 2021.
U.S. Appl. No. 17/976,494, filed Oct. 28, 2022.
Advisory Action dated Nov. 22, 2022, U.S. Appl. No. 17/242,267, filed Apr. 27, 2021.
Response to Office Action dated Nov. 29, 2022, U.S. Appl. No. 17/242,275, filed Apr. 27, 2021.
Response to Office Action dated Dec. 6, 2022, U.S. Appl. No. 17/242,267, filed Apr. 27, 2021.
Notice of Allowance dated Jan. 10, 2023, U.S. Appl. No. 17/242,267, filed Apr. 27, 2021.
Notice of Allowance dated Jan. 11, 2023, U.S. Appl. No. 17/242,275, filed Apr. 27, 2021.
Amendment under 37 CFR 1.312 dated Jan. 23, 2023, U.S. Appl. No. 17/242,275, filed Apr. 27, 2021.
U.S. Appl. No. 18/191,781, filed Mar. 28, 2023.
U.S. Appl. No. 18/193,540, filed Mar. 30, 2023.
Response to Communication pursuant to Rules 161(1) and 162 EPC dated Dec. 20, 2023, European Patent Application No. 22715808.6.
Communication pursuant to Rules 161(1) and 162 EPC dated Oct. 19, 2023, European Patent Application No. 22715808.6.

* cited by examiner

AUGMENTED REALITY SYSTEM FOR VIEWING AN EVENT WITH MULTIPLE COORDINATE SYSTEMS AND AUTOMATICALLY GENERATED MODEL

PRIORITY

This application claims priority to U.S. Provisional Patent Application No. 63/159,870, entitled "Augmented Reality System for Viewing an Event" and filed Mar. 11, 2021 by Jayaram et al., which is incorporated by reference in its entirety.

BACKGROUND

The present technology relates to the use of augmented reality (AR).

When viewing a sporting event or other activity/event, whether at the actual venue or remotely (such as on television), the activity may be difficult to follow or even see. Although broadcasters sometimes insert graphics into broadcast images or provide alternate views, these are selected by the broadcaster and may not correspond to what individual viewers would like to see. Additionally, when a viewer is watching an event at the venue, such added content may not be available to that viewer at the venue and, even when it is, would not correspond to different viewpoints of different individuals at the event.

DETAILED DESCRIPTION

Figure 1:
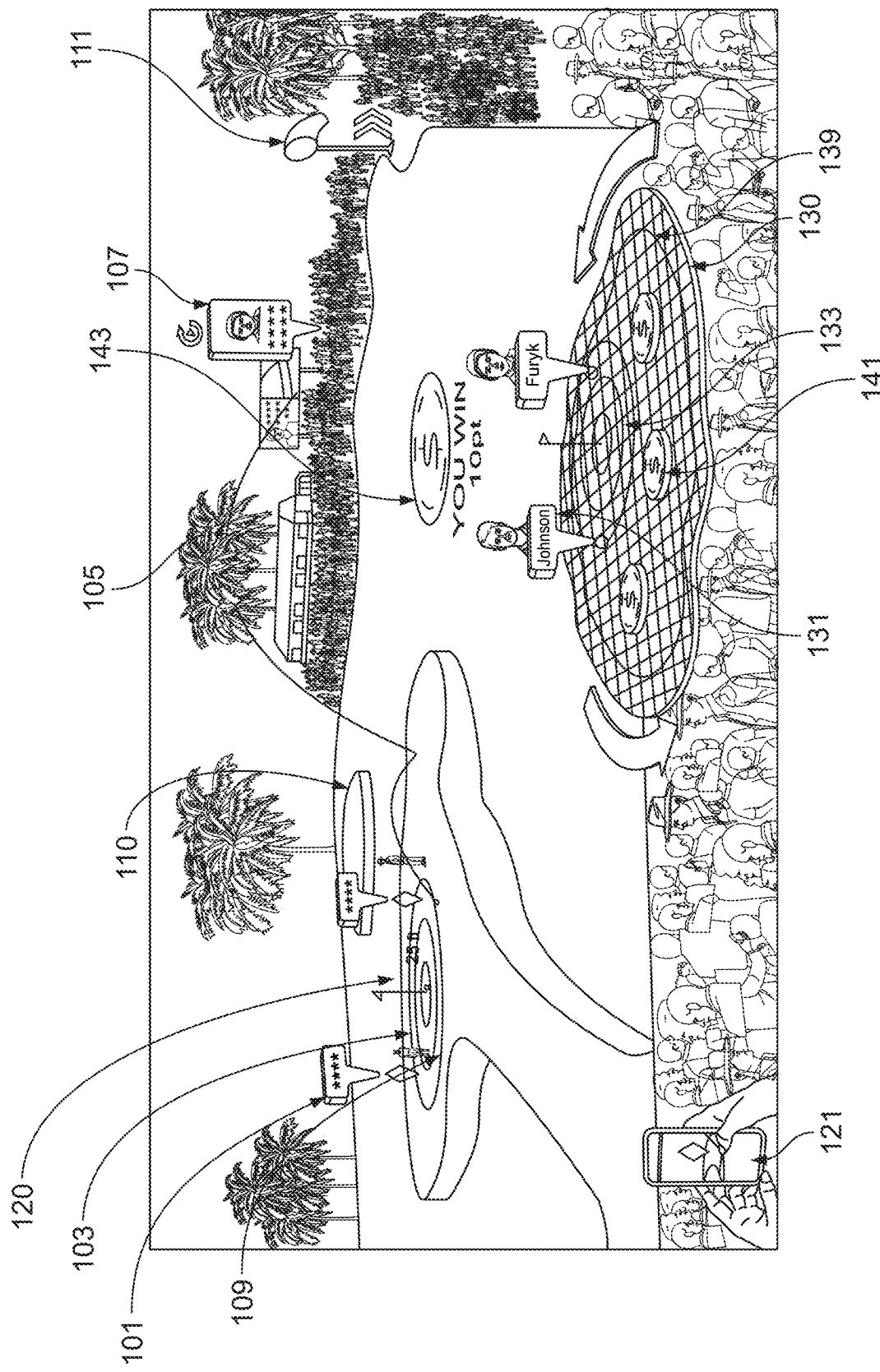
FIGS. 1 and 2 illustrate examples of the presentation of AR graphics and added content at an outdoor venue and an indoor venue.

The following presents techniques for enhancing live sports action and other events for fans who attend events at the venue or to augment their watching experience remote from the venue using augmented reality (AR) with mobile telephones, headsets, glasses, smart televisions, or other devices. At an event's venue, live viewing can enhance the live viewing process, such as by providing individual viewers accurate real time playing surface registration, and allowing live dynamic event data visualization synchronized to the playing surface action so that the entire venue becomes the canvas with accurate wayfinding and location based proposals. At home or other remote viewing locations (such as a sports bar), live tabletop AR streaming can provide dynamic event data visualization synchronized to tabletop streaming and live dynamic event data visualization synchronized to live TV. The techniques can also provide gamification, whether though institutional gaming, friend-to-friend wagering, or similar play for fun.

To be able provide AR content to users that corresponds to their individual points of view, the users' individual positions and orientations have to be precisely determined relative to the real world. For example, if the user is at a venue and is viewing the event on a smart phone, the position and orientation of the smart phone and its camera's images will have an internal set of coordinates that need to be correlated with the real world coordinates so that content based on real world coordinates can be accurately displayed on the camera's images. Similarly, when viewing an event on a television, the camera supplying an image will have its coordinate system correlated with the real world coordinate system.

One way to track a moving camera is through use of simple optical flow techniques to latch on to simple ephemeral patterns in an image and track them frame-to-frame; however, to relate this to the real world, there needs to be a separate process that identifies unique features in the image that have been surveyed and their real world locations used to accurately locate to the viewer. A traditional computer vision approach detects visual features in a reference image, creates a numeric descriptor for that feature, and save numeric descriptor in a database, along with real world location determined by some surveying technique. For a new image, features are then detected in the image, their descriptors computed and found in the database, and the corresponding spatial information in the database is used to determine a viewer's position and orientation. This approach has a number of limitations. In many sports venues, for example, fields of view are made up of organic, non-2-D shapes (for example, trees along a fairway of a golf course) that vary widely with viewing direction and are difficult to uniquely identify. Additionally, the images will often have large areas of features that should be ignored, like moving crowds, changing scoreboards, and moving shadows, for example. Other difficulties include changing lighting conditions that change the appearance of features and many detectable features that are not distinctive enough to be uniquely identified (such as tree trunks or repeating fence posts).

To improve upon this situation, the following discussion presents a number of novel techniques. By detecting specific kinds of features in an image (e.g., the ridge line and edges of a tent, trunks of tress, location of the peaks of the trees) that can be surveyed, the same details can be identified in an image, and, using starting estimates of view position and orientation (such as from smart phone's GPS, compass, and gravitometer), a correspondence can be established between what a user can see and what has been surveyed in a database. The system can optimize the match between a 2D image of expected features based on the database and position estimates versus the smart phone's 2D camera image. More specifically, rather than use every example of a visual feature, only certain examples of features are used, with iterative techniques applied to accurately identify those features by their 3D spatial location, even though each feature is not distinctive in itself. Employing multiple feature types together can provide a robust, flexible solution, so that rather than develop an ad-hoc solution for every different viewing environment, the system can create a framework to support detecting different specific features and using them all to solve location problems and add new kinds of features to support different environments.

Examples of different kinds of features that might be used include straight-line edges of man-made structures and the corners at which they meet, where these might have specific constraints such as one side of the edge is white and a certain number of pixels widths. For outdoor venues, an example can include tree trunks, where these might comprise the 3D points of the bottom and top of a clearly identifiable segment, plus its diameter. In a golf course example, an outline of a green against the rough, the outline of a sand bunker, or a cart path against grass can provide a curving line of points in 3D space. The outline of a tree, or tops of individual trees, against the sky can be a useful reference if it can provide a clean outline and the tree is far away. For any of the features, repeatability of detections regardless of light changes and moving shadows is an important characteristics. To survey the features, the 3D location of features can be measured using multiple views from different positions with instrumented cameras (e.g., cameras with sensors that measure location and/or orientation).

As used here, surveying a venue is the process of building a collection of features, represented by their logical description along with their 3D position information, in a spatially-organized database. For example, the locations of points could be measured directly, for example, by using a total station (theodolite) survey device, which can accurately measure azimuth, elevation, and distance to a point from a surveyed location and direction. These typically use laser range finding, but might also use multiple view paths, like a stadimeter. On a golf course, for example, sprinkler head locations are useful reference points with accurately surveyed locations. The surveying process may use cameras to collect video or still imagery from multiple locations for the venue. In some embodiments, these survey images can include crowd sourced images. These images are then registered to a real world coordinate system, typically by one or both of accurately measuring the location of the camera using GPS, or by use compass and inertial measurement unit (IMU). This may require special techniques like establishing a reference GPS base station to get sufficient accuracy. Fiducials (visual reference objects) can be placed in well-surveyed positions such that there can be several in the field of view of any image. The fiducials can also be used to infer the location of other distinctive points within the images. Based on the fiducials and the located distinctive points, the process can register other images that may not contain enough fiducials. In some embodiments, a path of images can be digitized, with features being registered from one image to the next without surveying fiducials and then use post-processing to optimize estimates of the position of those points to match surveyed reference points: For example, a fiducial in the first and last frame of a sequence of images may be enough to accurately position corresponding points across the sequence of images, or these may be determined by structure from motion techniques.

As used here, registration is the process of establishing a correspondence between the visual frames of reference. For example, registration may include establishing a correspondence between the visual frames of reference that the mobile viewing device establishes on the fly (the coordinates of the mobile device's frame of reference) and a coordinate system of a real world frame of reference. In many situations, an accurate orientation registration may be more important than position registration. Accuracy is determined by how much pixel error there is in, for example, placing a virtual graphic (e.g., image) at a specific location in a real world scene. In one set of embodiments, based on the internal coordinates for a frame of reference of a view-tracking app on a user's device (e.g., ARKit on an iPhone) for a particular image, this can provide information on how 3D rays to several points in the image from the user's mobile device can be used to establish a transformation between the user's mobile device and its real world location so that virtual objects can be accurately drawn atop the video of the scene every frame. Depending on the embodiment, registration for a mobile device can be performed periodically and/or by relying on the mobile device's frame-by-frame tracking ability once a registration is in place. How much of the registration process is performed on the individual user's mobile device versus how much is performed on a remote server can vary with the embodiment and depend on factors such as the nature and complexity of detection of features, database lookup, and solution calibration.

Figure 2:
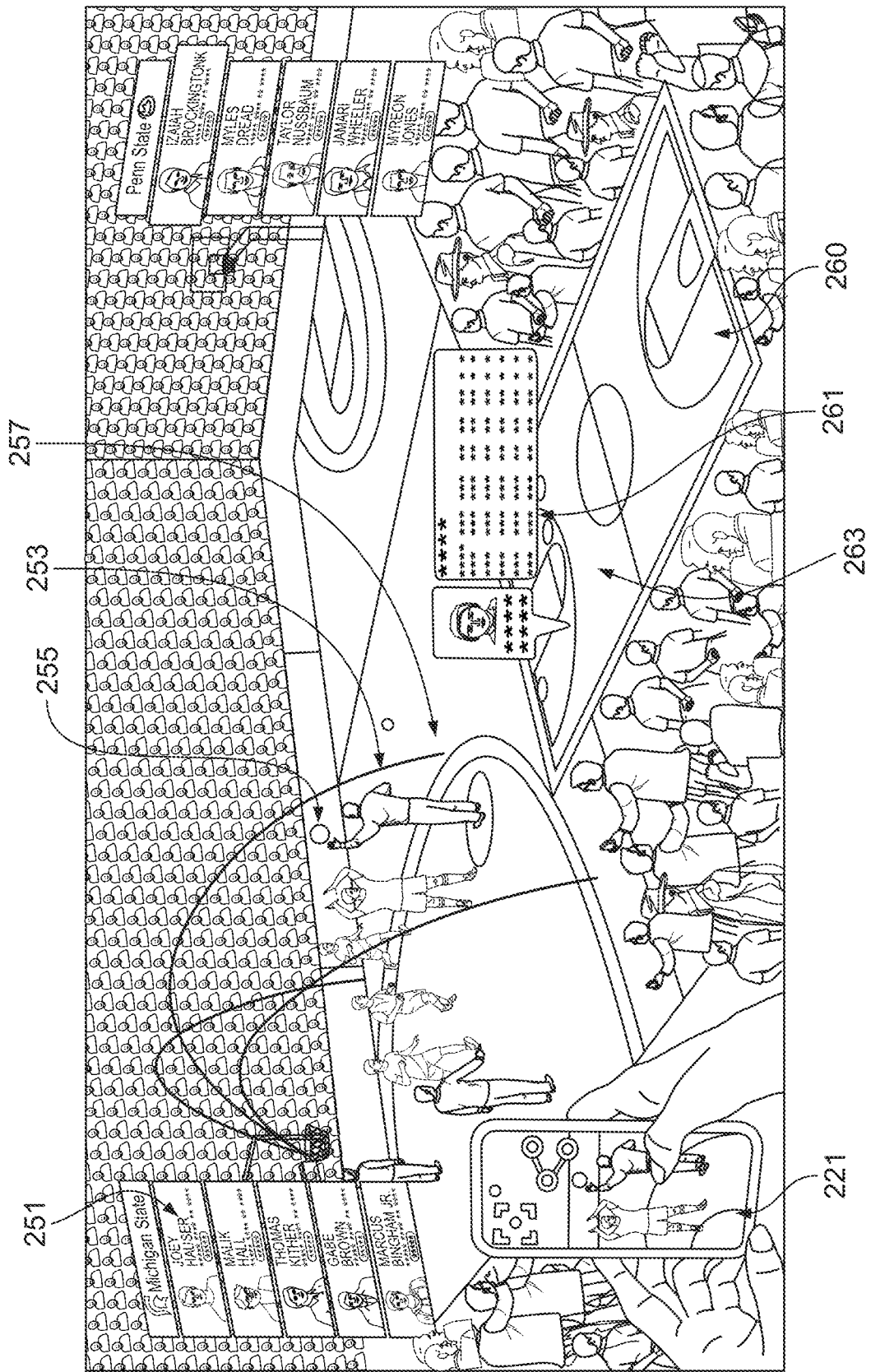

FIGS. 1 and 2 illustrate some of the examples of the presentation of AR graphics and added AR content at an outdoor venue and an indoor venue, respectively. FIG. 1 illustrates a golf course venue during an event, where the green 120 (extending out from an isthmus into a lake) and an island 110 are marked out for later reference. FIG. 1 shows the venue during play with spectators present and a user viewing the scene with enhanced content such as 3D AR graphics on the display of a mobile device 121, where the depicted mobile device is smart phone but could also be an AR headset, tablet, or other mobile device.

Some examples of the graphs that can be displayed on a viewer's mobile device are also represented on the main image. These include graphics such as player information and ball location 101 for a player on the green 120, concentric circles indicating distances 103 to the hole, ball trajectories 105 with player information 107 on the tee location, and a grid 109 indicating contours and elevation for the surface of the green. Examples of data related to course conditions include the wind indication graphic 111.

The graphics can be overlaid on the image as generated by the mobile device. The user can make selections based on a touchscreen or by indicating within the image as captured by the mobile device, such as pointing in front of the device in its camera's field of view to indication a position within the image. For example, the viewer could have a zoomed view 130 displayed on the mobile device. The zoomed view 130 can again display graphics such as player info and ball location 131, concentric distances to the holes 133, and a contour grid 139. The viewer could also rotate the zoom view, such as indicated by the arrows. Also indicated in relation to the zoom image are wager markers 141 as could be done by different viewers on mobile devices on a player-to-player basis, along with an indicator of betting result information 143.

FIG. 2 illustrates the indoor venue example of a basketball game, with a viewer with a mobile device 221 providing 3D AR graphics over the image of the mobile device 221. On the image of the game are shown some example AR graphics, such as player information 251, ball trajectories 253, current ball location 255, and player position and path 257. Other examples of content include a venue model 260, player statistics 261, and a player path 263 in the court.

Figure 3:
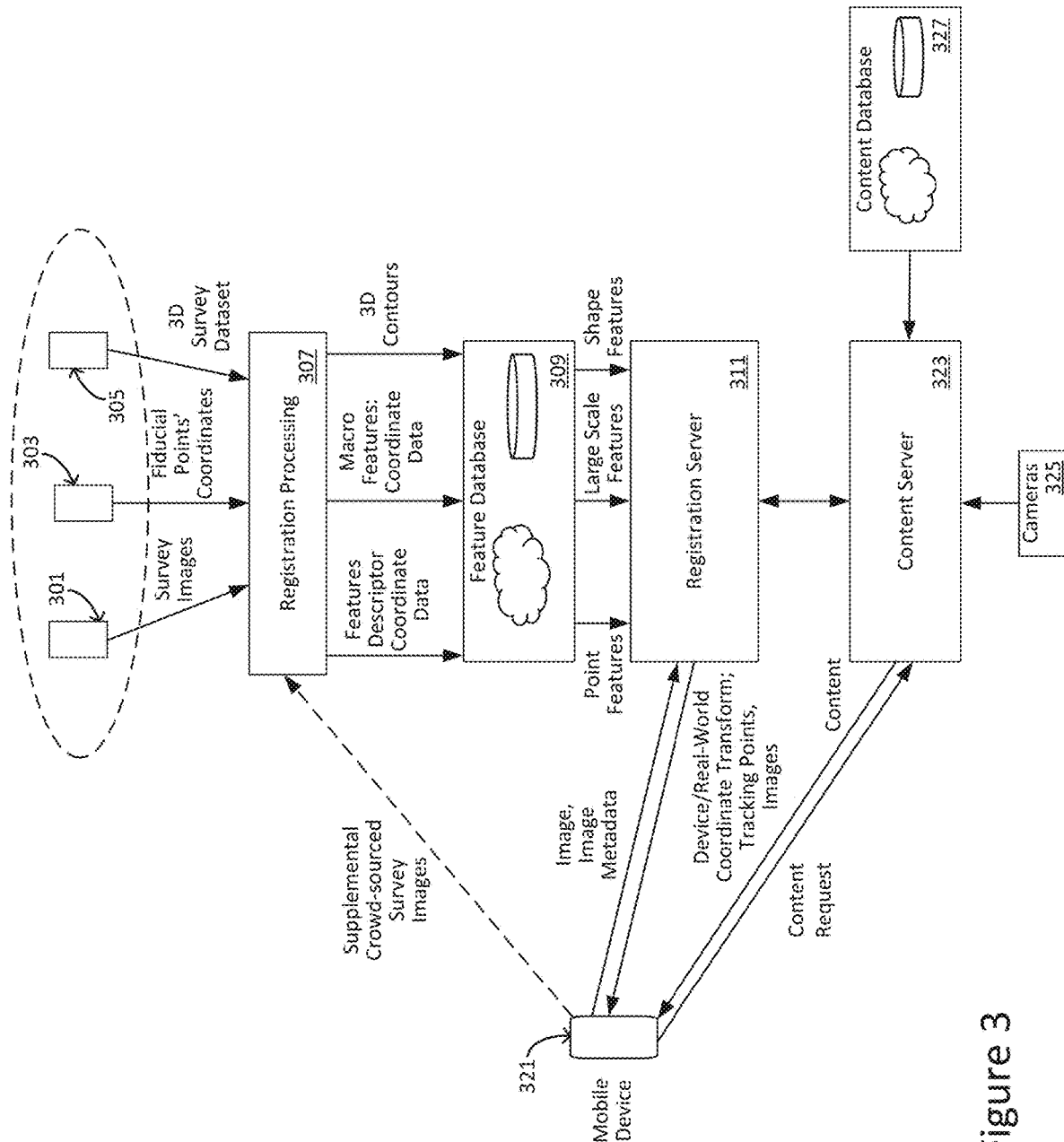
FIG. 3 is block diagram of elements for an embodiment of a system to register a user's mobile device and provide augmented reality content to the user's mobile device.

FIG. 3 is block diagram of one embodiment of a system to register a user's mobile device and provide AR content to the user's mobile device. FIG. 3 only illustrates a single mobile device 321, but, as discussed in more detail below, there can be many (e.g., thousands) such devices operating with the system concurrently. In an example where the user is at a venue, the mobile device 321 could be a cell phone, tablet, glasses, or a head mounted display, for example, and, in the case of multiple users, their respective mobile devices can be of different types. Note that in some embodiments, some of the components of FIG. 3 can be combined.

AR content to display on the mobile device 321, such as on the 2D camera image of a smart phone as illustrated in the examples of FIGS. 1 and 2, can be provided by a content server 323, where the content can be retrieved from a content database 327 or from a live source, such as in-venue cameras 325. Content database 327 can be one or both of a local database or a cloud database. Examples of content stored in the database can include things such as 3D terrain contours (i.e., elevations of a green for a golf course) or other venue data that can be acquired prior to the event or provided by venue. The content can also include live data about the event, such as scoring, performance related statistics, environmental data (e.g., weather) and other information. Other content can include live image data from cameras 325 that can supplement a user's point of view, such as through a "binocular view" to give a closer point of view or to fill in a user's occlusions, or other live material, such as ball trajectories. The content can be provided from the content server 323 automatically, such as based on previous setting, or directly in response to a request from the mobile device. For example, the user could indicate requested information by touching the display or manually indicating a position such as by placing a finger with the mobile device's field of view. As the content from the content server 323 is referenced to a real world coordinate system, the mobile device 321 will need a transformation between the real world coordinate system and the mobile device's coordinate system.

The transformation between the mobile device's coordinate system and the real world coordinate system is provided to the mobile device 321 by registration server 311. From the mobile device 321, the registration server 311 receives images and corresponding image metadata. For example, the image metadata can include information associated with the image such as camera pose data (i.e., position and orientation), GPS data, compass information, inertial measurement unit (IMU) data, or some combination of these and other metadata. In some embodiments, this metadata can be generated by an app on the mobile device, such as ARKit running on an iPhone (or other mobile device). Using this data from the mobile device 321 and data in a registration feature database 309, the registration server 311 determines a transform between the coordinate system of the mobile device 321 and a real world coordinate system. In one set of embodiments, the device to real world coordinate transform can be a set of matrices (e.g., transformation matrices) to specify a rotation, translation, and scale dilation between the real world coordinate system and that of the mobile device. Once that mobile device 321 receives the transformation matrices (or other equivalent data), as the mobile device moves or is oriented differently (a change of pose), the mobile device 321 can track the changes so that the transformation between the mobile device's coordinate system and the real world coordinate system stays current, rather than needing to regularly receive an updated transformation between the mobile device's coordinate system and the real world coordinate system from the registration server 311. The mobile device 321 can monitor the accuracy of its tracking and, if needed, request an updated transformation between the mobile device's coordinate system and the real world coordinate system.

Registration server 311 is connected to a feature database 309, which can be one or a combination of local databases and cloud databases, that receives content from registration processing 307, which can be a computer system of one or more processors, that receives input from a number of data sources. The inputs for registration processing 307 includes survey images of multiple views from different positions from one or more survey image sources 301, such as one or more instrumented cameras. Embodiments can also include coordinates for fiducial points as inputs for the registration processing 307, where the fiducial points are points with the fields of view of the survey images and that have their coordinates values in the real word coordinate system by use of fiducial coordinate source devices 303, such as GPS or other device that can provide highly accurate real world coordinate values. In some embodiments, a 3D survey data set can also be used as an input for registration processing 307, where the 3D survey data can be generated by 3D surveying device 305 and, for many venues, will have previously been generated and can be provided by the venue or other source.

To be able to draw 3D graphics accurately over mobile device's 2D picture of the real world, the registration server 311 needs to know the viewer's/mobile device 231 position, the way that it is looking (its pose orientation), and camera details such as field of view and distortion. A process for accurately locating the mobile device and generating accurately aligned camera or other mobile device imagery can be broken down into three steps: First, prior to the event, assembling a database of visible features that will be visible from the range of viewer locations; second, when a viewer initially starts using the app, the location of the viewer's mobile device is determined, and a set of visual features in the mobile device's field of view is established so that the system can accurately register the graphics as presented on the mobile device to the real world; and third, as the viewer continues to use the app, the mobile device is re-oriented to look at different parts of a scene, tracking features in field of view (such as on a frame-by-frame basis) to maintain an accurate lock between the real world and the augmented reality graphics.

To build the registration feature database 309, survey data is collected for the venue and assembled into a single reference map to serve as a model for the venue. Within the reference map, viewing areas can be identified and planning can be made for the location of temporary structures such as viewing stands, tents, or signage. Reference makers for use as fiducials are also identified. Note that the reference map may not be a literal map, but a collection of data representing the relevant set of features (as described herein).

At the venue, prior to event, photos are taken along the line of viewing areas, such as at every 10 feet or 3 meters (or other intervals or distances), and corresponding metadata, such as camera location and orientation, is accurately measured. Multiple cameras can be used, such as three cameras with one looking horizontally in the viewing direction, one camera 45° to the left, and one camera 45° to the right. The photos are taken with high resolution (e.g., 8 megapixel each) and can be saved with high quality JPEG compression, with the imagery and metadata transferred to a central server (e.g., registration processing 307, registration server 311 or another computing device). The cameras can be connected to a very accurate GPS receiver, compass, inclinometer, and gyroscope, so that the camera locations can be known to within a few inches and their orientation to within a few hundredth of a degree. For improved accuracy, the focal length and distortion for each camera can be pre-measured on an optical bench. To more easily move the camera rig 301 around a venue it could be mounted on a golf cart or a drone, for example.

Figure 7A:
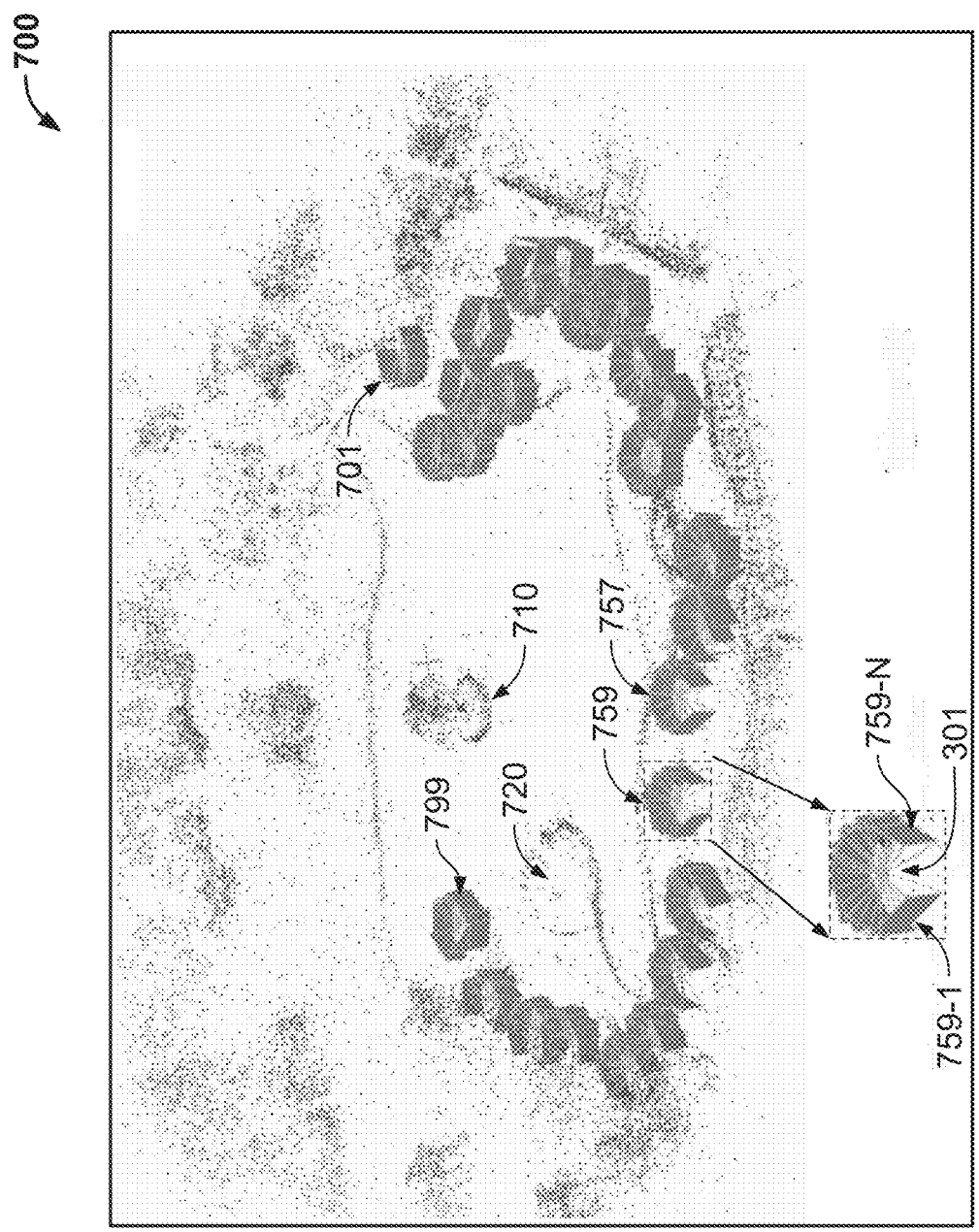
FIG. 7A illustrates the collection of survey images by a survey camera at a venue.
Figure 8:
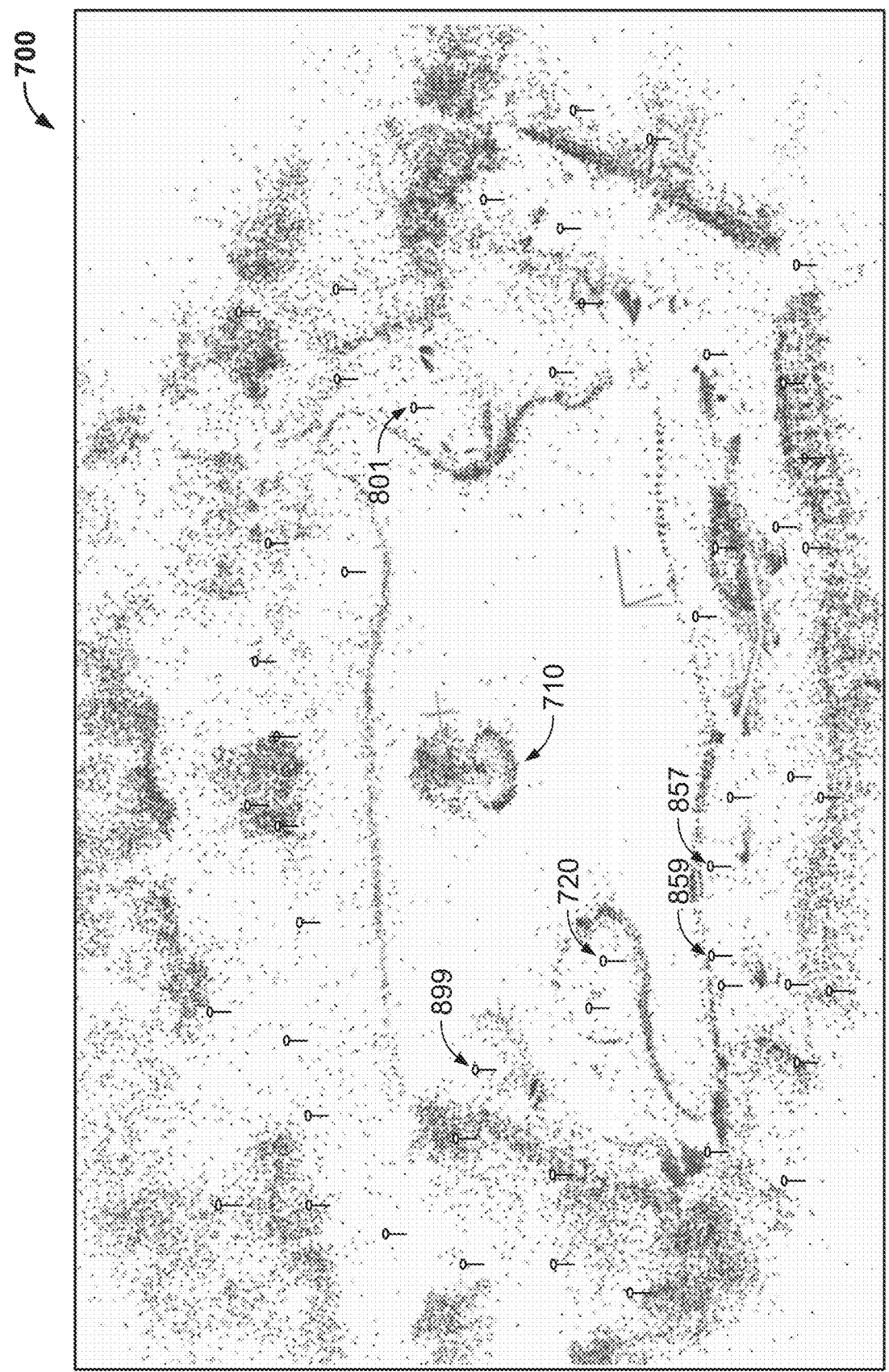
FIG. 8 illustrates the collection of fiducials at a venue.

Once the survey images and their metadata are gathered, they are stored on a computer (e.g., registration processing 307, registration server 311 or another computing device). Surveyed reference points, such as sprinkler locations or visible fiducials placed on reference points, are located prior to taking the photos. The pixel location of fiducial markers can be identified in a variety of the survey images and their 3D coordinates determined via triangulation using the camera parameters, such as discovered from a Structure from Motion (SfM) process. In the processing, these fiducial points are used to refine the measured camera positions and orientations, so that the coordinate system of the photos can be aligned to the real world coordinate system. As described in more detail in the following discussion, given the real world coordinates of the fiducial markers and the SfM coordinates, a transformation is found that maps between the coordinate system of the individual mobile devices and the real world coordinate system. FIGS. 7A and 8 respectively illustrate the collection of photos and the use of fiducials, and FIGS. 9 and 10 respectively present flowcharts for survey preparation and image collection.

Figure 4:
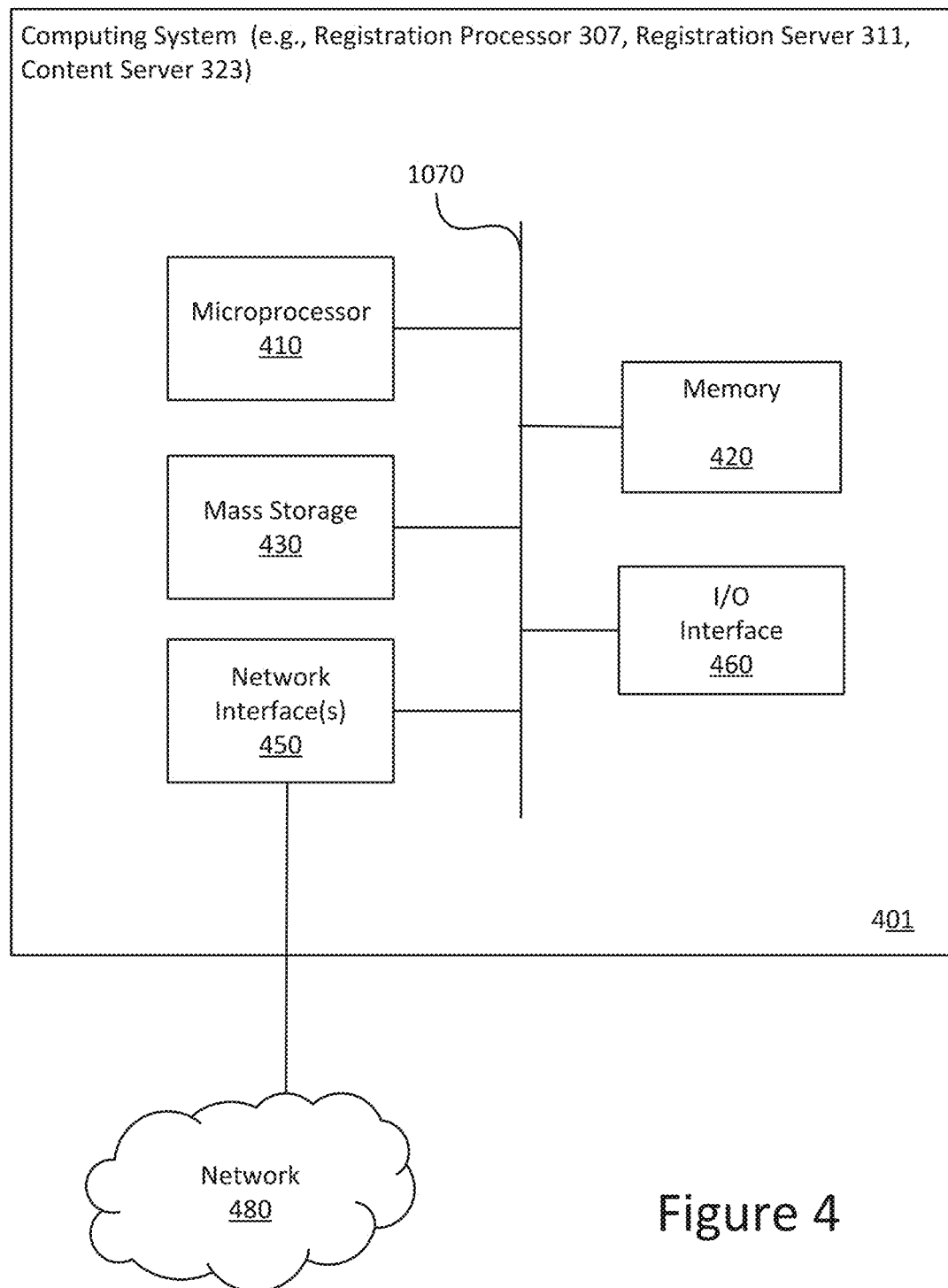
FIG. 4 is a high-level block diagram of one embodiment of a general computing system that can be used to implement various embodiments of the registration processor, registration server and/or content server.

FIG. 4 is a high-level block diagram of one embodiment of a more general computing system 401 that can be used to implement various embodiments of the registration processing 307, registration server 311 and/or content server 323. Specific devices may utilize all of the components shown, or only a subset of the components, and levels of integration may vary from device to device. Furthermore, a device may contain multiple instances of a component, such as multiple processing units, processors, memories, transmitters, receivers, etc.

In FIG. 3, the registration server 311 and the content server 323 are represented as separate blocks based on their different uses, but it will be understood that these functions can be implemented within the same server and that each of these blocks can be implemented by multiple servers. Consequently, depending on the embodiment, the registration server 311 and the content server 323 can implemented as a single server or as a system of multiple servers. The components depicted in FIG. 4 includes those typically found in servers suitable for use with the technology described herein, and are intended to represent a broad category of such servers that are well known in the art.

The computing system 401 may be equipped with one or more input/output devices, such as network interfaces, storage interfaces, and the like. The computing system 401 may include one or more microprocessors such as a central processing unit (CPU) 410, a graphic processing unit (GPU), or other microprocessor, a memory 420, a mass storage d430, and an I/O interface 460 connected to a bus 470. The computing system 401 is configured to connect to various input and output devices (keyboards, displays, etc.) through the I/O interface 460. The bus 470 may be one or more of any type of several bus architectures including a memory bus or memory controller, a peripheral bus or the like. The microprocessor 410 may comprise any type of electronic data processor. The microprocessor 410 may be configured to implement registration processing using any one or combination of elements described in the embodiments. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs.

The mass storage 430 may comprise any type of storage device configured to store data, programs, and other information and to make the data, programs, and other information accessible via the bus 470. The mass storage 430 may comprise, for example, one or more of a solid-state drive, hard disk drive, a magnetic disk drive, an optical disk drive, or the like.

The computing system 401 also includes one or more network interfaces 450, which may comprise wired links, such as an Ethernet cable or the like, and/or wireless links to access nodes or one or more networks 480. The network interface 450 allows the computing system 401 to communicate with remote units via the network 480. For example, the network interface 450 may provide wireless communication via one or more transmitters/transmit antennas and one or more receivers/receive antennas. In an embodiment, the computing system 401 is coupled to a local-area network or a wide-area network for data processing and communications with remote devices, such as other processing units, the Internet, remote storage facilities, or the like. In one embodiment, the network interface 450 may be used to receive and/or transmit interest packets and/or data packets in an ICN. Herein, the term "network interface" will be understood to include a port.

The components depicted in the computing system of FIG. 4 are those typically found in computing systems suitable for use with the technology described herein, and are intended to represent a broad category of such computer components that are well known in the art. Many different bus configurations, network platforms, and operating systems can be used.

Figure 5:
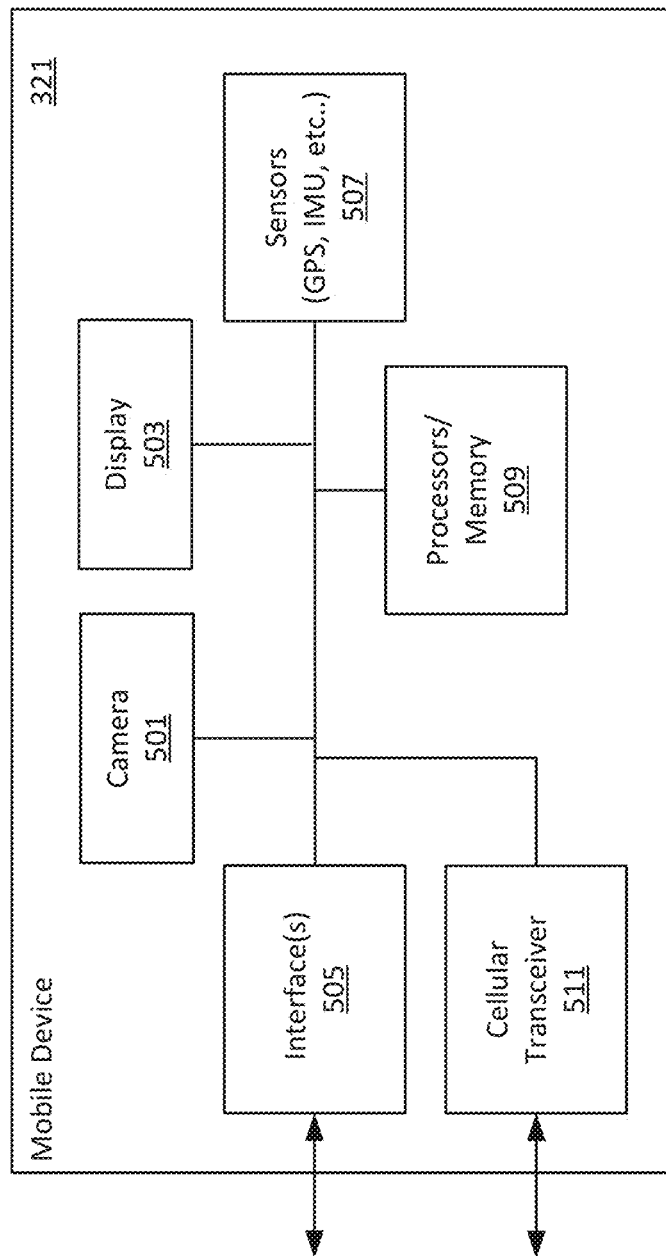
FIG. 5 is a bock diagram of a mobile device that can be used for displaying graphics of a view at a venue.

FIG. 5 is a high-level block diagram of an embodiment of a mobile device 321 that can be used for displaying graphics of a view at a venue, such as described above. Embodiments of the mobile device can include a smart phone, tablet computer, laptop computer, or other device in which the view of the venue is presented on a display 503, such as a screen with the graphics content also represented on the display. Other embodiments can include head mounted displays, such as AR headsets or AR glasses, that display the graphics over the view of the venue as watched through the head mounted display. The multiple mobile devices that can be used concurrently with the systems presented here can be various combinations of these different varieties of mobile devices. FIG. 5 explicitly includes elements of the mobile device 321 relevant to the discussion presented here, but will typically also include additional elements, but that do not enter into the current discussion and are not shown.

The embodiment of FIG. 5 includes a camera 501 and one or more sensors 507 that respectively provide image data and metadata for the image data that can be used in the registration process described above. Mobile devices 321 such as smart phones typically include a camera 501, such as based on charge coupled devices or other technology, that can provide the image data and also the image of the venue on the mobile device's display screen, while for a head mounted display, the camera 501 would provide the image data, although it may not be displayed directly to the viewer. The sensors 507 can include devices such as GPS receivers, a compass, and an inertial measurement unit (e.g., accelerometer). The metadata from the sensors 507 can provide information on the pose (location and orientation) of the camera 501 when capturing the image data, but will be within the mobile device's internal coordinate system that may only loosely be aligned with the real world coordinate system.

The mobile device 321 also includes one or more interfaces 505 through which the mobile device 321 can communicate with the registration server 311 and content server 323. The interface 505 can use various standards and protocols (Bluetooth, Wi-Fi, etc.) for communicating with the servers, including communicating with the registration server 311 for the registration process and with the content server 323 to request and receive graphics and other content. The cellular transceiver 511 can also be used be used to communicate with the registration server 311 and content server 323, as well as for telephony.

A mobile device 321 also includes one or more processors 509, with associated memory, that are configured to convert the graphics from the content server 323 into the mobile device's coordinate system based on the transformation between the mobile device's coordinate system and the real world coordinate system as received from the registration server 311. The processor(s) 509 can be implemented as ASICs, for example, and be implemented through various combinations of hardware, software, and firmware. The processor or processors 509 can also implement the other functionalities of the mobile device not related to the operations describe here, as well as other more relevant functions, such as monitoring latencies in communications with the servers and adapting the amount of processing for the registration and display of graphics done on the mobile device 321, relative to the servers, based on such latencies.

The display 503 is configured to present the graphics over the view of the venue. In the case of device where the display 503 is a screen (such as a smart phone or tablet), the view of the venue can be generated by the camera 501, with the graphics also displayed on the screen. In this case, user input (such as related to gamification or requesting specific graphics) can be input by a viewer using the display and/or, in some embodiments, by indicating within the view of the venue from the camera 501, such as by finding the user's fingertip within the image and projecting a ray to this location to, for example, touch where a ball will land or to touch an object to place a bet. In a head mounted display 503, such as AR goggles or glasses, the graphics or other content can be presented over the view of the venue through the mobile device 321, where the user can make indications within the view.

Figure 6:
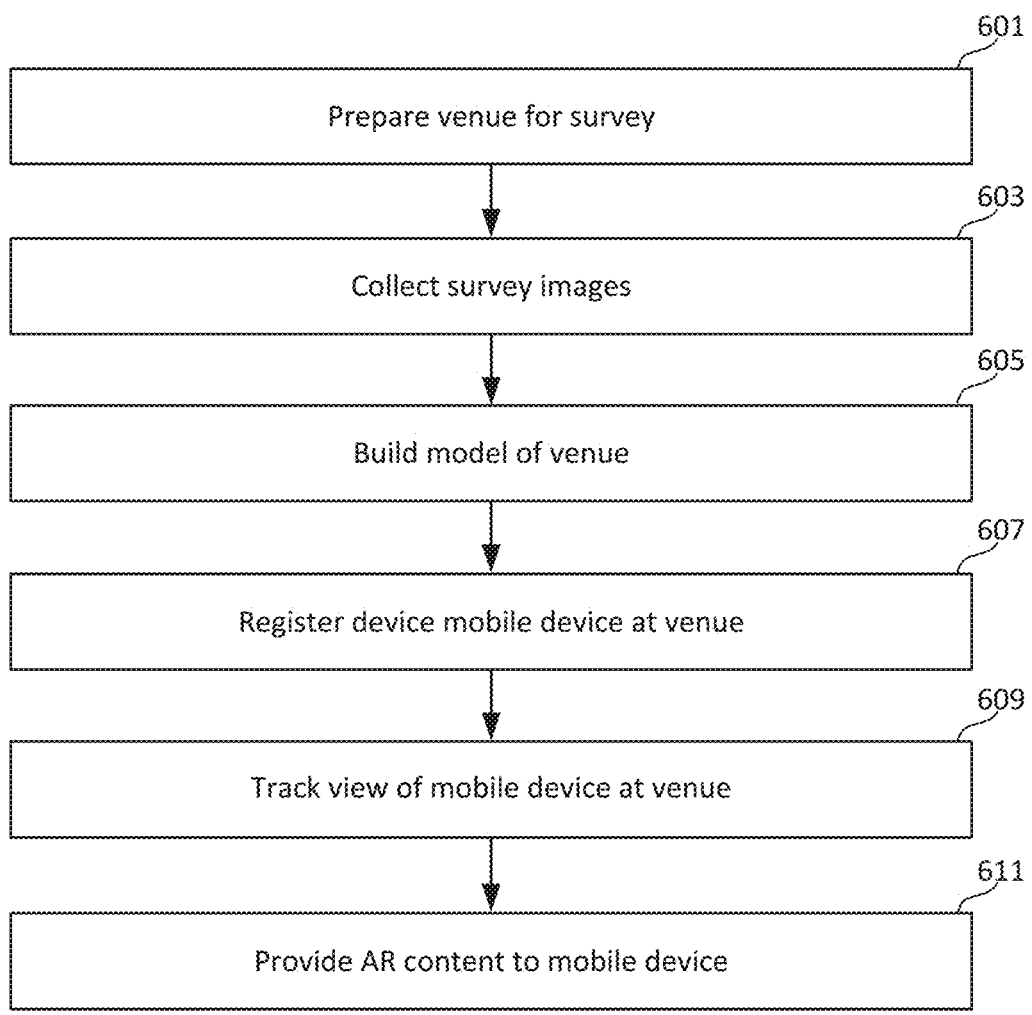
FIG. 6 is a flowchart of one embodiment of a process for operation of an AR system to provide content to viewers at a venue.

FIG. 6 is a is a flowchart describing one embodiment for the operation of an AR system for providing viewers with AR graphics over views of an event. Beginning at step 601, the venue is prepared for a survey to collect image mages and fiducial points' coordinates that are supplied to the registration processing 307. Step 601 is discussed in more detail with respect to FIG. 9. The survey images are then collected in step 603, which is described in more detail with respect to FIG. 10. From the data collected is steps 601 and 603, the registration processing 307 builds a model of the venue, as described further with respect to FIG. 11. Steps 601, 603, and 605 are typically performed before the event, although data can also be collected during an event, such as through crowd sourced image data, to refine the model.

Before the event, mobile devices 321 are registered with a server system including a registration server 311 at step 607. This is done by each mobile device 321 sending the registration server 311 image data and metadata, that will be in the coordinate system of the mobile device, to the registration server. For each mobile device 321, the registration server can then build a transformation for converting positions/locations between the mobile device's coordinate system to a real world coordinate system. The registration server 311 also sends each mobile device 321 template images with a set of tracking points within each of the template images at step 609. The template images with tracking points allow for each of the mobile devices 321 to maintain an accurate transformation between the mobile device's coordinate system and the real world coordinate system as the mobile device changes its pose (i.e., location and orientation). Registration and tracking is described in more detail with respect to FIGS. 13A and 13B. At step 611 a registered mobile device 321 can then request and receive AR content, such as graphics to display of views of an event at a venue, from the content sever 323. More details about step 611 are provided below with respect to FIG. 17.

FIG. 7A illustrates the collection of survey images by a survey camera at a venue. In this example, the venue is the same as illustrated in FIG. 1, but shown as a point cloud 700 generated from features within the venue prior to the event and without spectators. For comparison to FIG. 1, the island 710 and green 720 are given reference numbers corresponding to reference numbers 110 and 120 in FIG. 1. The individual points of the point cloud 700 correspond to features for use in the registration process as described below. One of the data inputs to the process is the survey data as generated by a survey camera rig 301.

Figure 9:
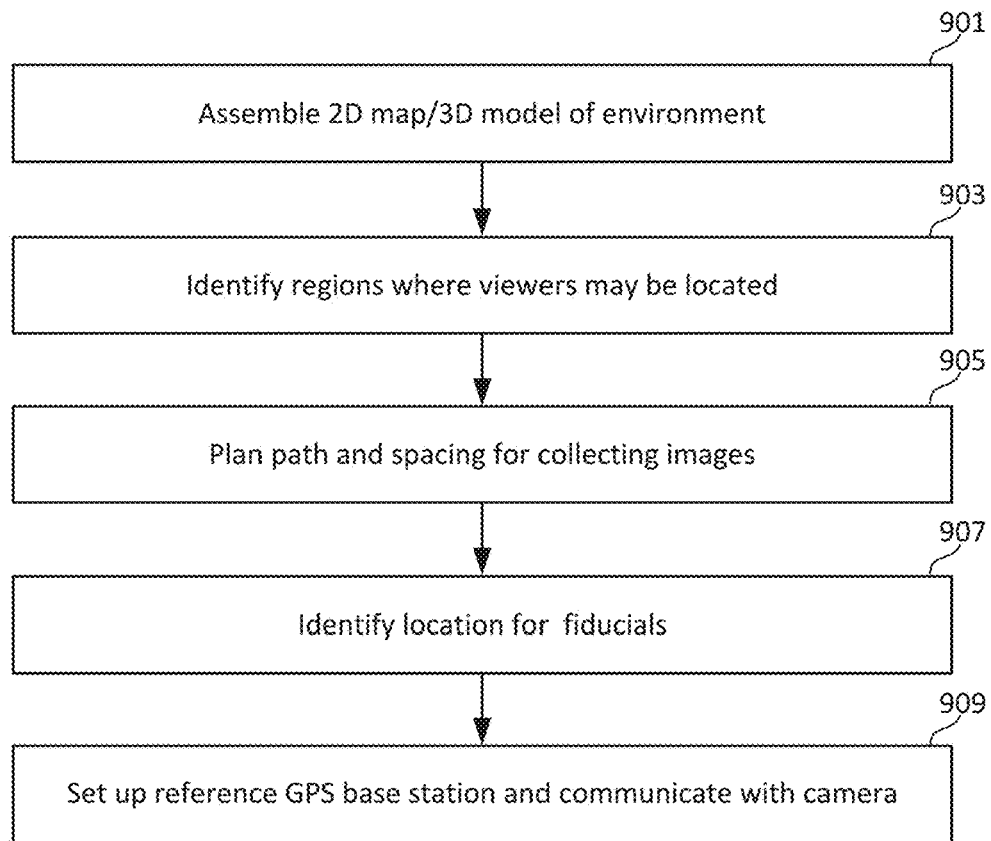
FIG. 9 is a flowchart of one embodiment of a process for preparing a venue for a survey.
Figure 10:
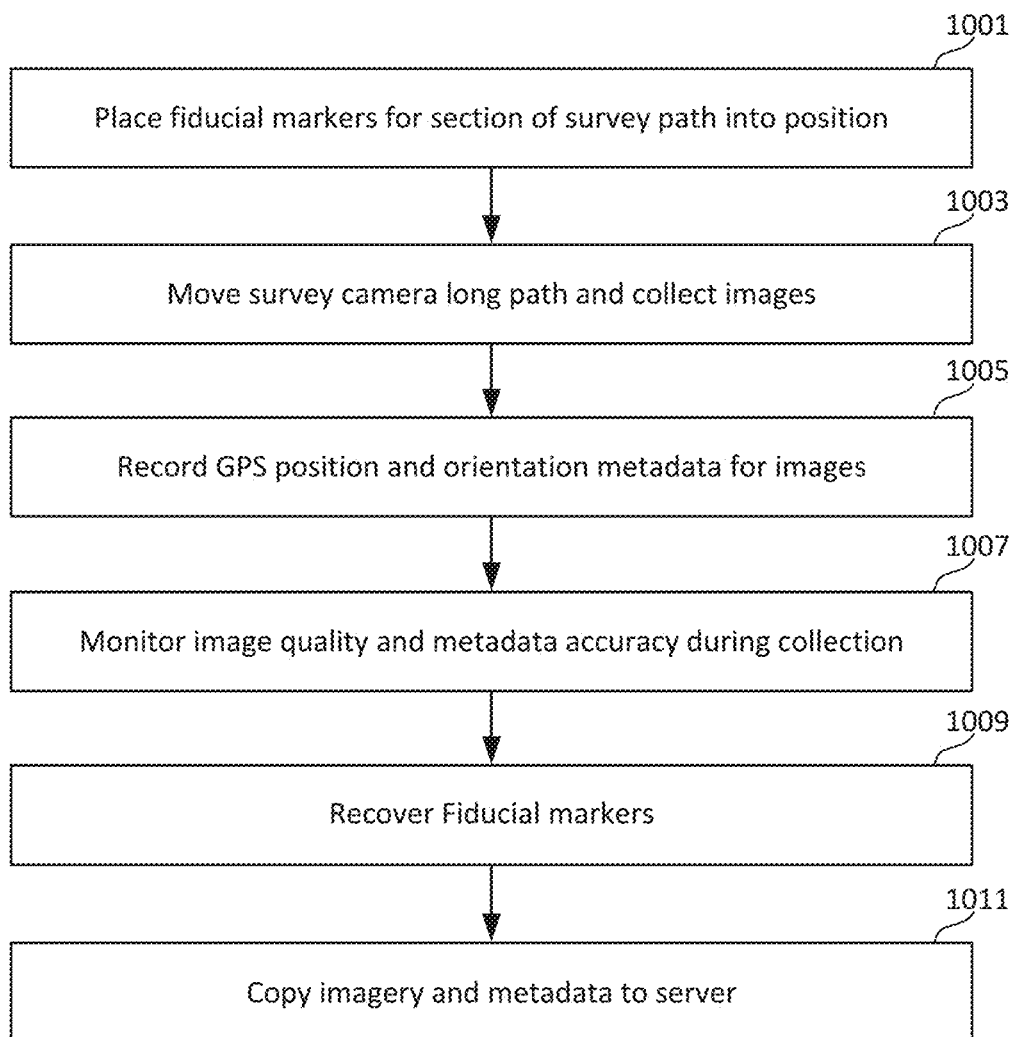
FIG. 10 is a flowchart of one embodiment of a process for collecting survey images.

FIG. 7A illustrates the collection of multiple images from multiple locations at the venue, where FIGS. 9 and 10 describes an embodiment for the process to collect these survey images. In FIG. 7A, several dozen sets of images collected at specific points, where several of these image collections (701, 757, 759, 799) at some of these locations are explicitly numbered. The actual process can include additional collections of images, such as in the upper portions of the image, but these are not included in FIG. 7A to avoid the Figure becoming overly complicated. The number of such locations and the number of photos taken will vary based on the specifics of the venue and the event, but as described below, these will typically be collected at positions where viewers are likely to be located and with sufficient density be able to perform an accurate registration process.

In the lower portion of FIG. 7A is an expanded view of the collection of images 759 to illustrate the collection more clearly. At the center is the location of the survey camera rig 301 used to collect a set of images, where the survey camera rig 301 can include a single camera or multiple cameras along with equipment to determine the camera location and orientation. The images are represented by a set of N frustums (e.g., truncated pyramids), where a first frustum 759-1 and an Nth frustum 759-N are labeled. The wider base of a frustum (the darker, labeled rectangles) correspond to the 2D image as seen by the camera from its pose when the image is taken and narrow base of a frustum corresponds to the 2D plane of the image collection surface for the camera. The images taken at a given position are taken to overlap and to cover the directions of likely fields of view for users of the mobile devices during the event.

Figure 7B:
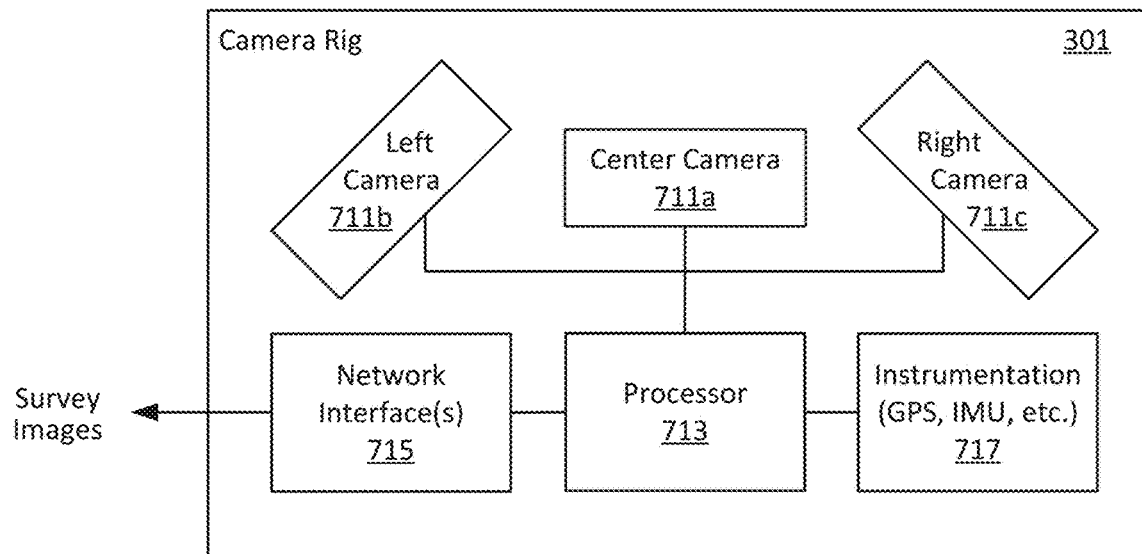
FIG. 7B is a block diagram of an embodiment of a camera rig that can be used for taking the survey images.

FIG. 7B is a block diagram of an embodiment of a multi-camera survey camera rig 301 that can be used for taking the survey images. In one embodiment, three cameras with a center camera (711a) looking horizontally in the viewing direction, one camera (711b) angled 45° to the left, and one camera (711c) angled 45° to the right. The cameras can have high resolution (e.g., 8 megapixel each) and can use high quality JPEG compression, with the imagery and metadata transferred over interface 715 to a central server. Depending on the embodiment, the images can be processed on the individual cameras (711a, 711b, 711c) or by a separate processing/memory section 713 incorporated into the survey camera rig 301. The survey camera rig 301 can also include instrumentation 717 to determine the metadata for the orientation and location of the cameras' images. The instrumentation can include a GPS receiver, compass, IMU, and gyroscope, for example, so that the camera locations can be known to within a few inches and their orientation to within a few hundredth of a degree.

FIG. 8 illustrates the collection of fiducials at a venue. The venue of FIG. 8 is the same as for FIGS. 1 and 7A and again shows the same point cloud 700 and reference features of the island 710 and green 720, but with the image collections (e.g., 701, 757, 759, 799) not shown. The fiducials will be placed prior to, and included in, the collection of survey images, but the image collections are not shown in FIG. 8 for purposes of explanation. The placement and collection of fiducials are described in more detail with respect FIGS. 9 and 10.

FIG. 8 shows a number of fiducials within the point cloud 700, where several examples of the fiducials (801, 857, 859, 899) are explicitly labeled. As described below, the number and placement of the fiducial will depend on the venue, type of event, and where the survey images are to be collected. The position of the fiducials are determined so that their points' coordinates in the real world coordinate system is well known. This can be done by placing the fiduciaries at locations with well-known coordinates, such as is often the case for features in the venue (e.g., sprinkler locations of a golf course), by accurately measuring the locations of fiduciaries by a GPS or other positioning device, or a combination of these.

FIG. 9 is a flowchart of one embodiment of a process for preparing a venue for a survey, providing more detail for step 601 of FIG. 6. To organize the collection of survey data, a preliminary model is assembled for the environment of the venue at step 901, where this can be a 2D or 3D model and can often be based on information available from the venue or bases on a rough survey. Based on this model, regions where viewers will be located during event are identified at step 903. For example, if the venue is a golf course, viewing arrays are typically around the tee, around the green, and along portions of the fairway. In an indoor venue, such as for a basketball game, the viewing arrays correspond to locations in the stands. At step 905, the identified viewer locations can be used to plan a path and spacing for points at which to collect the survey images.

In step 907, locations that will be within the images are identified as location for fiducials, where these can be objects in known locations that will be visible in the survey images and which can be used to infer the location and orientation of the survey camera location with high accuracy (i.e., down to fractions of inches and degrees). In the example of a golf course, one choice of fiducial locations can be sprinkler head locations, as these are plentiful, easy to find, and their locations are often carefully surveyed by the venue. To make fiducials easier to locate within the survey image, these can be marked by, for example a white or florescent yellow sphere a few inches in diameter mounted on a stand that lets it be located as a specified height (e.g., an inch above a sprinkler head). In some cases, to improve accuracy, a reference GPS base station in communication with the survey camera rig can be set up at step 909.

FIG. 10 is a flow of one embodiment of a process to collect survey images following the preparation of Described with respect to FIG. 9 and provides more detail for step 603 of FIG. 6. Starting at step 1001, any wanted fiducial marker are placed for a section of the survey path. Depending on the implementation, this can be all of the fiducial markers for the entire survey or for a section of the survey, with the marked moved from views already photographed to subsequent views as the survey camera rig 301 is moved along the survey path. As discussed above, the survey camera rig 301 can be part of rig of multiple cameras along equipment to determine corresponding metadata for the images. The survey camera rig 301 is moved along the path, such as the planned path from step 905, collecting images in step 1003. In the case of a fixed rig of several cameras, at each location the rig can collect a set of images looking in several directions and at different focal lengths, which can be fixed. In terms of instrumentation, the survey camera rig 301 can include an accurate GPS receiver, where this can be referenced to a base station in some embodiments. The GPS receiver can also be integrated with an initial measurement unit, or IMU, with linear and rotational rate sensors, and additionally be integrated with a magnetic compass. Step 1005 records the GPS position and orientation metadata for each of the images. As the images and their metadata are accumulated, the image quality and metadata accuracy can be monitored at step 1007. Once the images are collected, the fiducial markers can be recovered at step 1009 and the survey imagery and corresponding metadata copied to a server at step 1011.

In some embodiments, the survey images can be augmented by or based on crowd crowd-soured survey images from viewers' mobile devices 321. For example, users could be instructed to provide images of a venue before or even during an event, taking photos with several orientations from their viewing positions. This can be particularly useful when an event is not held in a relatively compact venue, such as a bicycling race in which the course may extend a great distance, making a formal survey difficult, but where the course is lined with many spectators who could supply survey image data. In some instances, as viewers provide crowd-sourced survey images, the registration process can be updated during an event. For embodiments where crowd-sourced survey images are provided prior to the event, these crowd sourced images can be used along with, and in the same manner as, the survey images collected prior to the event by the camera rig 301. When the crowd-sourced survey images are provided during the event, they can be combined with the initial survey data to refine the registration process. For example, based on the pre-event survey images, an initial model of the venue can be built, but as supplemental crowd-sourced survey images are received during an event, the feature database 309 and registration process can be made more accurate through use of the augmented set of survey images and the model of the venue refined. This sort of refinement can be useful if the views of a venue change over the course of the event so that previously used survey images or fiducial points become unreliable.

In some embodiments, for venues or portions of venues where survey images and fiducials are sparse or absent (e.g., a cycling race), the crowd-sourced survey images and their metadata can be used without the survey images from a camera rig 301 or fiducial point data. The crowd-sourced survey images and their corresponding metadata alone can be used in the same manner as described for the survey images generated by a camera rig 301 and the lack of fiducials from a survey can be replaced by extracting some degree of fiducial point data from the crowd-sourced survey images and their metadata. The model can be generated using crowd sourced images in combination with survey images, using survey images only, or using crowd sourced images only. The images are crowd sourced images as they are provided from the public at large (e.g., those at the venue) and function to divide work between participants to achieve a cumulative result (e.g., generate the model). In some embodiments, the identify and/or number of the plurality of mobile devices used to provide the crowd sourced images are not known in advance prior to the event at the venue.

To have accurately generated real world coordinate data for the fiducials, as part of the survey process these locations can be determined by a GPS receiver or other fiducial coordinate source device 303. In some cases, the venue may already have quite accurate location data for some or all of the fiducial points so that these previously determined values can be used if of sufficient accuracy.

In some embodiments, 3D survey data and similar data can also be used as a source data. For example, this can be established through use of survey equipment such as by a total station or other survey device 305. Many venues will already have such data that they can supply. For example, a golf course will often have contour maps and other survey type data that can be used for both the registration process and also to generate content such as 3D graphics like contour lines.

Once the source data is generated, this can be used by the registration processing 307 to generate the feature database 309. The processing finds detectable visual features in the images, for those that can be detected automatically. The better features are kept for each image (such as, for example, the best N features for some value N), while keeping a good distribution across the frame of an image. For each image, a descriptor is extracted and entered into a database of features and per-image feature location. Post-processing can merge features with closely matching descriptors from multiple images of the same region, using image metadata to infer 3D locations of a feature and then enter it into the feature database 309. By spatially organizing the database, it can be known what is expected to be seen from a position in direction. Although one feature provides some information about position and orientation, the more features that are available, the more accurate the result will be. When a venue is a constructed environment, such as a football stadium or a baseball park, there will typically be enough known fiducials to determine position and orientation. In more open venues, such as golf course fairway with primarily organic shapes such as trees and paths, additional reference points may need to be collected.

Non-distinctive features in the images, such as a tree trunk, edge of a cart path, or the silhouette of trees against the sky, can be correlated across adjacent views to solve for 3D locations and then entered into the feature database 309. Such features can typically be detected, but often not identified uniquely. However, if where the image is looking is roughly known, it is also roughly known where to expect the features to be located. This allows for their arrangement in space to be used to accurately identify them and to accurately determine a location, orientation, and camera details. The process can also collect distinctive information extracted from the features, such as width of a tree trunk or size of a rock, to help identify the objects and include these in the database.

Once the images have been registered, they can be used in conjunction with a 2D venue map to identify spectator areas as 3D volumes. The tracking and registration process can ignore these volumes and not attempt to use features within them as they will likely be obscured. Other problem areas (large waving flags, changing displays, vehicle traffic areas) can similarly be ignored. In some cases, it can be useful to perform a supplemental survey shortly before an event to include added temporary structures that may be useful for registration and also reacquire any imagery that can be used to correct problems found in building the initial feature database 309. The feature database 309 can also be pruned to keep the better features that provide the best descriptor correlation, are found in a high number of images, and that provide a good distribution across fields of view.

Figure 11:
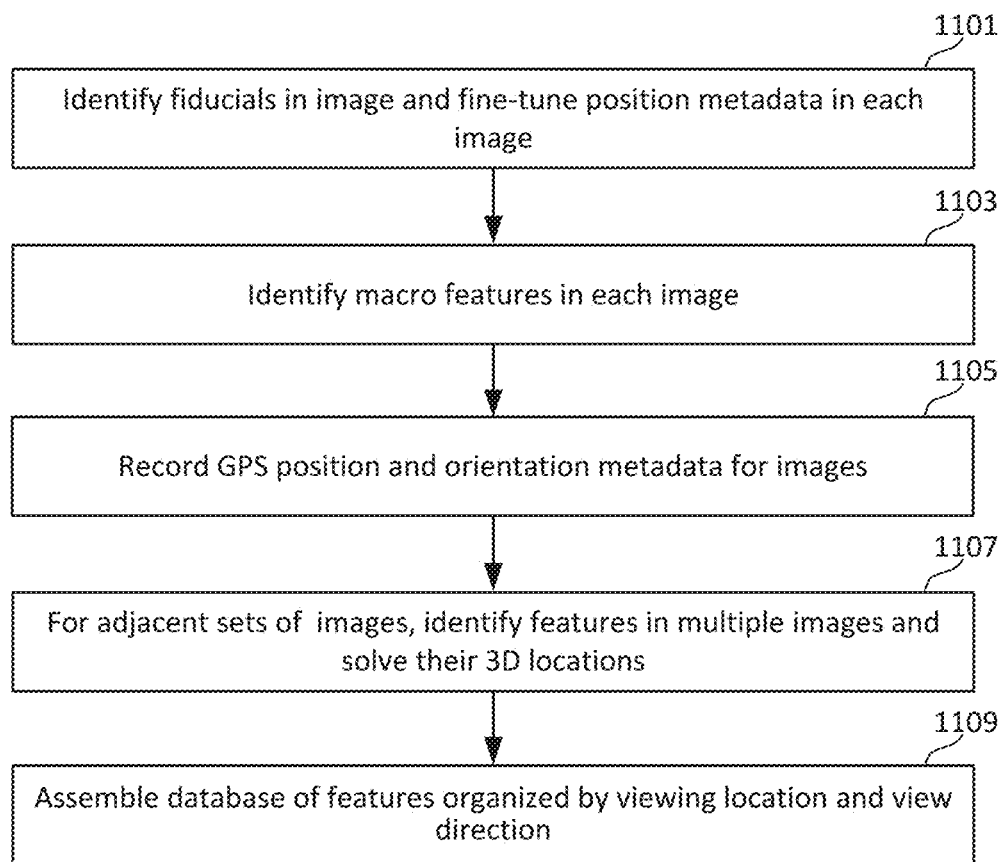
FIG. 11 is a high level flowchart of one embodiment of a process for processing imagery.

FIG. 11 is a flow chart describing one embodiment for processing the imagery in registration processing 307 to generate the data for the feature database 309 from the survey images, fiducial points' coordinates, and 3D survey data. The process of FIG. 11 is an example implementation of step 605 of FIG. 6. The processing can be done offline, with manual operations performed by several people in parallel, and with a mix of automated and manual effort. For the individual collected images, at step 1101 fiducials within the image are identified and the position metadata fine-tuned. Also, within the individual images, at step 1103 various types of macro features (i.e., large scale features identifiable visually be a person) that can be used for registration are identified. At step 1105 the GPS position and orientation metadata for the images are recorded, where the positions can be stored in cartesian coordinates as appropriate for the venue, for example. In addition to camera position and orientation, the metadata can also include camera intrinsic parameters such as focal distance, optical center, and lens distortion properties. Step 1107 looks at adjacent sets of images and identifies features present in multiple images and solves for their 3D location. The feature database 309 is assembled at step 1109, where this can be organized by viewing location and view direction, so that the registration server 311 can easily retrieve features that should be visible from an arbitrary location and view direction.

Figure 12:
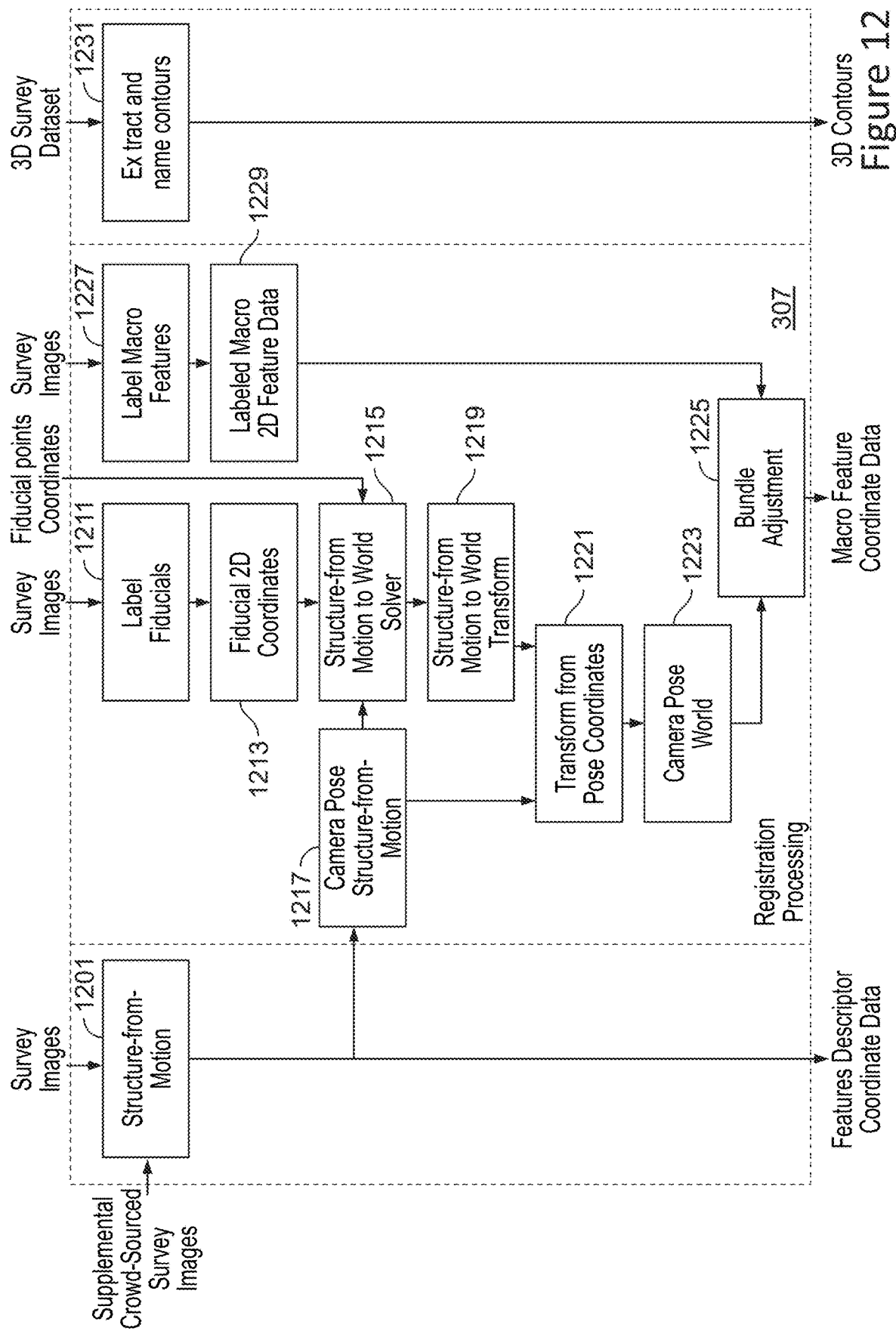
FIG. 12 illustrates embodiments for registration processing based on a three columned architecture.

FIG. 12 is a more detailed flowchart of the process for an embodiment for operation of the registration processing 307 based on a three columned architecture and illustrating how the steps of FIG. 11 fit into this architecture. Other embodiments may not include all of the columns, such as by not using the third column. In FIG. 12, the left most column uses the survey images, possibly including supplemental crowd-sourced survey images to generate descriptors and coordinate data for features. The middle column uses a combination of survey images and fiducial points' coordinates to generate macro feature coordinate data. The right column uses 3D survey data to generate 3D contours.

In terms the elements of FIG. 4, the inputs (the survey images, fiducial points coordinates, 3D survey dataset) can be received through the network interfaces 450 and the outputs (feature descriptor coordinate data, macro coordinate data, 3D contours) transmitted to the feature database or databases 309 by the network interfaces 450. The processing steps of FIG. 12 (e.g., 1201, 1215, 1221, 1225) can be performed by the microprocessor 410, with the resultant data (e.g., 1213, 1217, 1219, 1223, 1229) stored in the memory 420 or mass storage 430, depending on how the microprocessor stores it for subsequent access. For process operations that may require some degree of manual operation, such 1211, 1227, or 1231, these can also be performed by microprocessor 410 with manual input by way of the I/O interface 460.

Considering the left most column, the survey images can be acquired as described above with respect to the flows of FIGS. 9 and 10 and also, in some embodiments, incorporate crowd-sourced images. In some embodiments, Structure-from-Motion (SfM) techniques can be applied to process the images in block 1201, where SfM is a photogrammetric range imaging technique that can estimate 3D structures from a sequence of images. For example, the COLMAP SfM pipeline or SfM techniques can be used. The resultant output is a set of descriptors and coordinate data for the extracted features. For example, this can be in the form of scale-invariant feature transform (SIFT) descriptors that can be stored in the feature database 309. The SIFT descriptors can be, for example, in the form of a vector of 128 floating points values that allows for features to be tracked and matched by descriptors that are robust under varying viewing conditions and are not dependent on the features illumination or scale. The output of the structure-from-motion can also include camera pose data from the images for use in the second column of FIG. 12.

The second column of FIG. 12 includes inputs of the same survey images as the left column, both directly and through the camera pose data (i.e., position and orientation metadata) 1217, and of the fiducial points' coordinates. The fiducials within the survey images are labeled in block 1211, where this can include both automated and manual labeling as described above. The result of the labeling are the fiducial 2D coordinates within the images at block 1213.

The camera pose data obtained from structure-from-motion 1217 will be referenced to a coordinate system, but this is a free floating coordinate system used for the structure-from-motion process and not that of the real world. As the 3D graphics and other content that will be provided to the mobile device 321 needs to be in the same coordinate system as the images, the coordinate system of the camera pose data of structure-from-motion 1217 needs to be reconciled with a real world coordinate system. This is performed in the processing of structure-from-motion to real world solver 1215. The data inputs to the structure-from-motion to real world solver 1215 are the camera pose data of structure-from-motion 1217, the fiducial 2D coordinates data 1213, and the fiducial points' coordinates. The resultant output generated by the structure-from-motion to real world solver is a structure to real world transform 1219. In some embodiments, operations corresponding to some or all of the additional elements of the middle column of FIG. 12 can be moved to the registration server 311. For example, the elements 1221, 1223, and 1225 or their equivalents could be performed on the registration server 311, in which case the structure-from-motion transformation between the mobile device's coordinate system and the real world coordinate system would be stored in the feature database 309. As represented in FIG. 12, the additional elements of 1221, 1223, and 1225 are performed prior to the storage of data in the feature database 309.

Considering the structure-from-motion to real world transform 1219 in more detail, structure-from-motion is performed in a normalized coordinate system appropriate for numeric purposes and the camera extrinsic data is expressed in this coordinate system. The transform 1219 is a similarity transformation that maps points from the SfM coordinate system into the target, real world coordinate system. The cameras' coordinate system can be converted to a real world coordinate system based on a combination of a rotation and translation and a scale, rotation, and translation operation. The combination of these can be used to generate a transform matrix between the two coordinates systems.

As shown in the embodiment of FIG. 12, the registration processing 307 continues on to a transform pose process 1221 to transform the camera poses (their locations and orientations) used during the survey process to the real world coordinate system based on the camera pose from the structure-from-motion 1217 and the structure-from-motion to world transform 1219. The resultant data output is the camera pose to real world coordinate transformation 1223, allowing the camera pose in the camera's coordinate system to be changed into the camera's pose in the real world coordinate system.

The system also performs bundle adjustment 1225 based on the camera pose to world coordinate transformation 1223 data labeled macro 2D feature data 1229 as an input. The labeled macro 2D feature data 1229 is generated by a label macro features process 1227 to assign labels to the large scale macro features, where this can be a manual process, an automated process, or a combination of these, where this is often based on the types of features. Bundle adjustment is a process of, given a set of images depicting a number of 3D points from different viewpoints, simultaneously refining the 3D coordinates describing the scene geometry, the parameters of the relative motion, and the optical characteristics of the cameras employed to acquire the images. The bundle adjustment 1225 can be an optimization process for minimizing the amount of error between differing projections of the images, resulting in the output data of the macro features' coordinate data for storage in the feature database 309.

In embodiments including the third column of FIG. 12, a set of 3D contour data is generated from the 3D survey dataset by extracting and name contours process 1231. This can be a manual process, an automated process, or a combination of these. As noted above, the 3D survey dataset can include existing data provided by the event venue as well as data newly generated for the registration process.

As described above with respect to FIG. 3, the data from registration processing 307 are features' descriptor and coordinate data, macro-feature coordinate data, and 3D contour data. This data is stored in the feature database 309, from which the registration server 311 can retrieve these as point feature data, large scale feature data, and shape feature data for use in the registration process.

To register a viewer's mobile device 321, the registration server 311 receives the position, orientation, and field of view (or pos/orient/fov) data from the mobile device 321, such as from an API on phone or other mobile device 321. Prior to sending this data, which serves as metadata for the image data from the mobile device 321, the GPS and compass on the mobile device will calibrate themselves, this may include prompting the user to get a clearer view of the sky or perhaps move the mobile device through a figure-eight pattern, for example. Typically, this can provide a position within about 5 meters, an orientation within about 10 degrees, and a field of view withing about 5 degrees. The camera or other mobile device 321 can grab images, every 5 seconds for example, and perform basic validity checks, and send the image data and image metadata to the server.

Once the image data and metadata are at the registration server 311, the registration server 311 finds distinctive and non-distinctive features within the image and, using image metadata for position and orientation, compares this to expected features in the feature database 309. For example, the registration server 311 can use distinctive features to refine the position and orientation values, then use this location to identify the non-distinctive features to further solve for the position, orientation, and field of view of the mobile device 321 within the real world coordinate system. On the registration server 311, the solving problem identifies alignment errors for each feature, where these errors can be accumulated across multiple viewers and used to improve the 3D location estimation of the feature.

In some embodiments, the registration server 311 can prompt the user to do a pan left-right for the mobile device 321. The images from the pan can be captured and used to build up a simple panorama on the registration server 311. The registration server 311 can then build a pyramid of panorama images at a range of resolution values, find likely tracking points and reference, or "template", images including the likely tracking points, and sends these to the mobile device 321. Based on the tracking points and template images, the mobile device 321 can locate, find, and match reference points in image frames quickly on a frame-by-frame basis to get an accurate orientation value for the mobile device 321.

Once the mobile device 321 is registered, it can track the images, maintaining a model (such as a Kalman-filtered model) of the mobile device's camera's orientation, where this can be driven by the IMU of the mobile device 321 and tracking results from previous frames. This can be used by the mobile device 321 to estimate the camera parameters for the current frame. The mobile device can access the current set of simple features at their predicted location with a current image, such as by a simple template matching, to refine the estimate. Typically, it is expected that a mobile device 321 may have its orientation changed frequently, but that its location will change to a lesser amount, so that the orientation of the mobile device 321 is the more important value for maintaining graphics and other content locked on the imagery with the real world coordinate system.

The active set of simple features can be updated so that the area of view is covered, with simple features being discarded or updated based upon which simple features can be readily found and factors such as lighting changes. In some embodiments, the features can be reacquired periodically and re-solved for location and orientation to account for a viewer moving or due to a drifting of fast tracking values, for example. This could be done on a periodic basis (e.g., every minute or so), in response to the mobile device's GPS or IMU indicating that the viewer has moved, or in response to the matching of local reference features starting to indicate difficulties for this process. If the mobile device is unable to locate template features within the current image, a more detailed match against the panorama images can be performed, where this can start with the lower resolution images, to reacquire an orientation for the mobile device 321 or determine that the view is obstructed. In response to being unable to locate template features within the current image, the AR graphics and other content may be hidden or, alternately, continued to be displayed using a best guess for the mobile device's orientation. In some embodiments, the mobile device 321 can provide the user with a visual indication of the level of accuracy for the tracking, so that the user can be trained to pan smoothly and with a consistent camera orientation (i.e., mostly upward), and maintain a view of the scene in which obstructions are minimized.

Figure 13A:
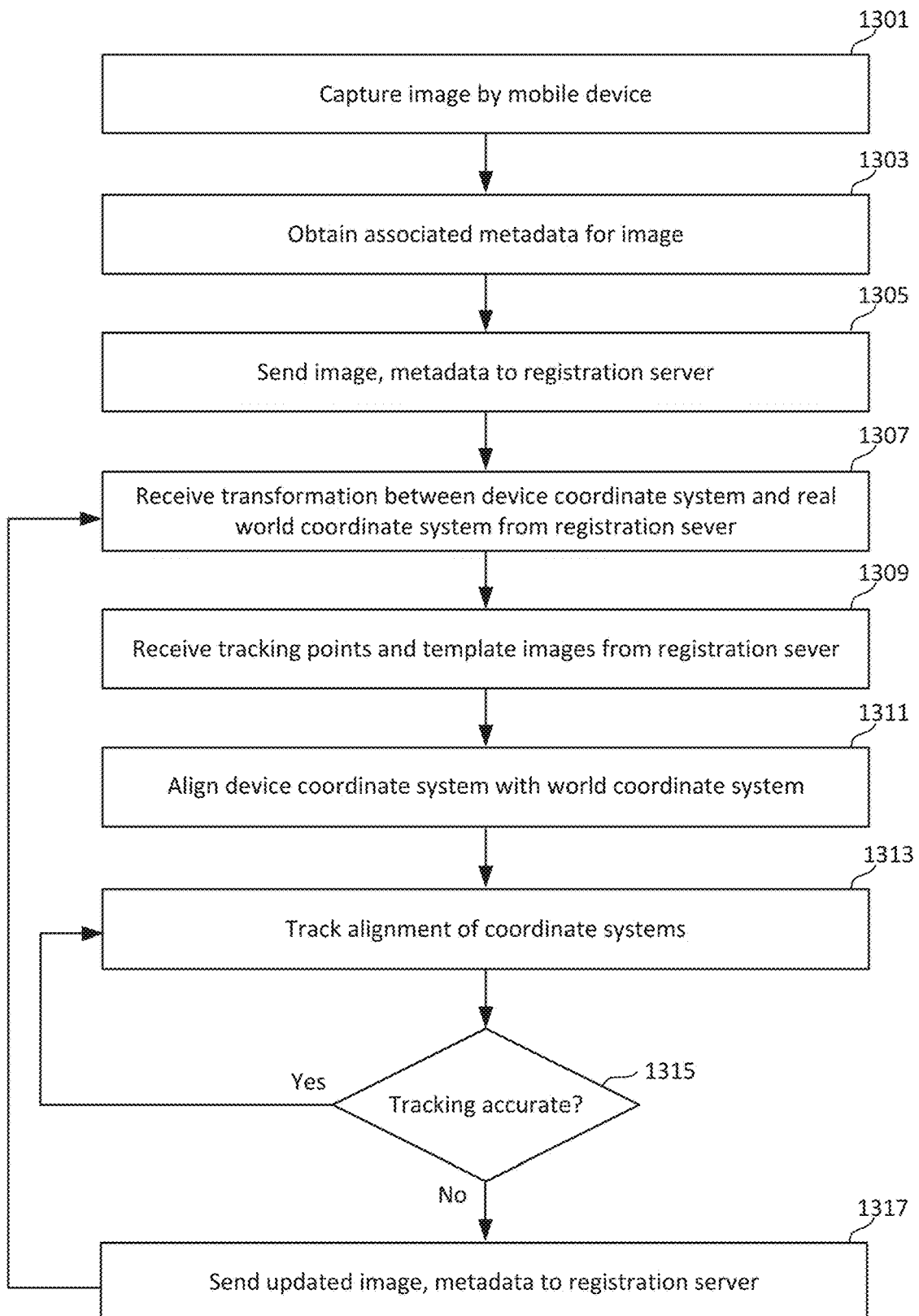
FIGS. 13A and 13B are flowcharts for embodiments of the registration and tracking process by the mobile device and of the registration process by the registration server.
Figure 13B:
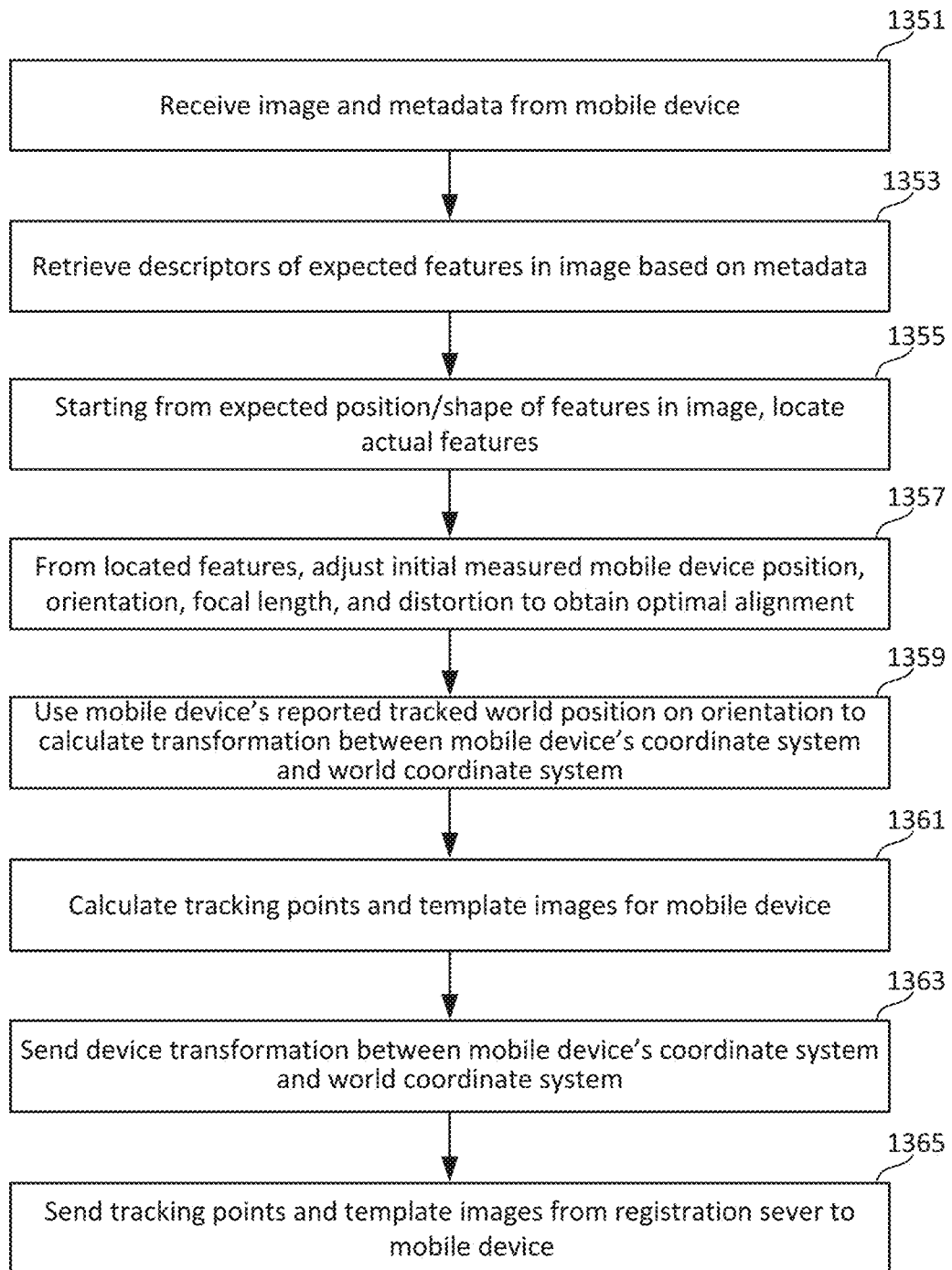

FIGS. 13A and 13B are flowcharts describing embodiments of the registration and tracking process of step 607 and 609 of FIG. 6. FIG. 13A describes the process performed by the mobile device 321 and FIG. 13B describes the registration process performed by the registration server 311. Once a user is at the venue, the user's phone or other mobile device 321 obtains one or more frames of image data containing from camera 501 along with the image's corresponding camera position and orientation metadata from the sensors 507, as described in the preceding paragraphs. Step 1301 of FIG. 13A is the capturing of the one or more images by the mobile device and step 1303 includes the accumulation of the corresponding metadata at the mobile device. Once accumulated and stored in the processors/memory 509, the image and image metadata can then be sent from the mobile device 321 to the registration server 311 at step 1305 over the interfaces 505 or cellular transceiver 511.

At steps 1307 and 1309, the mobile device 321 receives the transformation between the mobile device's coordinate system and the real world coordinate system and the tracking points and template images from the registration server 311. Before going to steps 1307 in FIG. 13A, however, FIG. 13B is discussed as it describes how the received information at steps 1307 and 1309 is generated on the registration server.

More specifically, FIG. 13B describes how the data sent from the mobile device 321 at step 1105 is used by the registration server 311 to generate the data received back the mobile device in steps 1307 and 1309. Starting at step 1351, the registration server 311 receives the image and image metadata from the mobile device 321 over the network interfaces 450. Based on the images' metadata, the registration server 311 retrieves the descriptors of expected features at step 1353 from feature database 309 over the network interfaces 450, where this data can be stored in the memory 420 or mass storage 430. Starting from the expected positions and shapes of the features in the images, and given the corresponding metadata (position, orientation, field of view, distortion), at step 1355 the registration server 311 locates, to the extent possible, the actual features. From the located features, at step 1357 registration server can adjust the initial measurement of the mobile device's metadata (camera position, orientation, focal length, distortion) and determine an optimal alignment. The tracked real world position and orientation of the mobile device 321 are then used by the microprocessor 410 of the registration server 311 to calculate the transformation between the mobile device's coordinate system and the real world coordinate system at step 1359. The registration server also calculates tracking points and template images for the individual mobile devices 321 at step 1361, where, as described in more detail below, the tracking points and template images are used by the mobile device to update its transformation between the mobile device's coordinate system and the real world coordinate system as the mobile device 321 changes pose. The transformation between the mobile device's coordinate system and the real world coordinate system can be in the form of a set of matrices for a combination of a rotation, translation, and scale dilation to transform between the coordinate system of the mobile device 321 and the real world coordinates. The calculated transformation between the mobile device's coordinate system and the real world coordinate system and tracking points/template images are respectively sent from the registration server 311 over the network interfaces 450 to the mobile device 321 at steps 1363 and 1365.

Returning now to FIG. 13A and the flow as seen by the mobile device, the mobile device 321 receives the transformation between the mobile device's coordinate system and the real world coordinate system (step 1307) and the tracking points and template images (step 1309). Once the registration is complete and the information of steps 1307 and 1309 received, by using this data by the processors/memory 509 the mobile device 321 can operate largely autonomously without further interaction from the registration server as long the tracking is sufficiently accurate, with the internal tracking of the mobile device 321 continuing to operate and generate tracking data such as, for example, on a frame-by-frame basis.

At step 1311, the mobile device 321 aligns its coordinate system with the real world coordinate system based on the transformation between the mobile device's coordinate system and the real world coordinate system. This can include retrieving, for each frame of the images, tracking position and orientation, converting these to real world coordinates, and drawing 3D graphics content from the content server over the images. This correction can be implemented as an explicit transformation in the 3D graphics scene hierarchy, moving 3D shapes into the tracking frame of reference so that it appears in the correct location when composited with over the mobile devices images.

Using the tracking points and template images, the alignment of the device to real world coordinate systems is tracked at step 1313 and the accuracy of the tracking checked at step 1315. For example, every frame or every few frames, the basic features supplied by the registration process at step 1309 are detected in the mobile device's camera 501 and verified that they are in the expected location. If the tracking is accurate, the flow loops back to step 1313 to continue tracking. If the reference features cannot be found, or if they are not within a margin of their expected location, the registration process can be initiated again at step 1317 by sending updated image data and metadata to the registration server 311. Additionally, the mobile device 321 can periodically report usage and accuracy statistics back to the registration server 311.

Although FIG. 3 explicitly illustrates only a single mobile device 321, and the flows of FIGS. 13A and 13B are described in terms of only a single mobile device, in operation the system will typically include multiple (e.g., thousands) such mobile devices and the flows of FIGS. 13A and 13B can be performed in parallel for each such mobile device. Additionally, the distribution of the amount of processing performed the mobile device relative to the amount of processing performed on the servers can vary based on the embodiment and, within an embodiment, may vary with the situation, such as by the mobile devices or registration servers could monitor the communication speed in real time. For example, if a latency in communications between a mobile device and the servers exceed a threshold value, more processing may be shifted to the mobile devices, while if transmission rates are high additional processing could be transferred to servers to make use of their greater processing power.

Figure 14A:
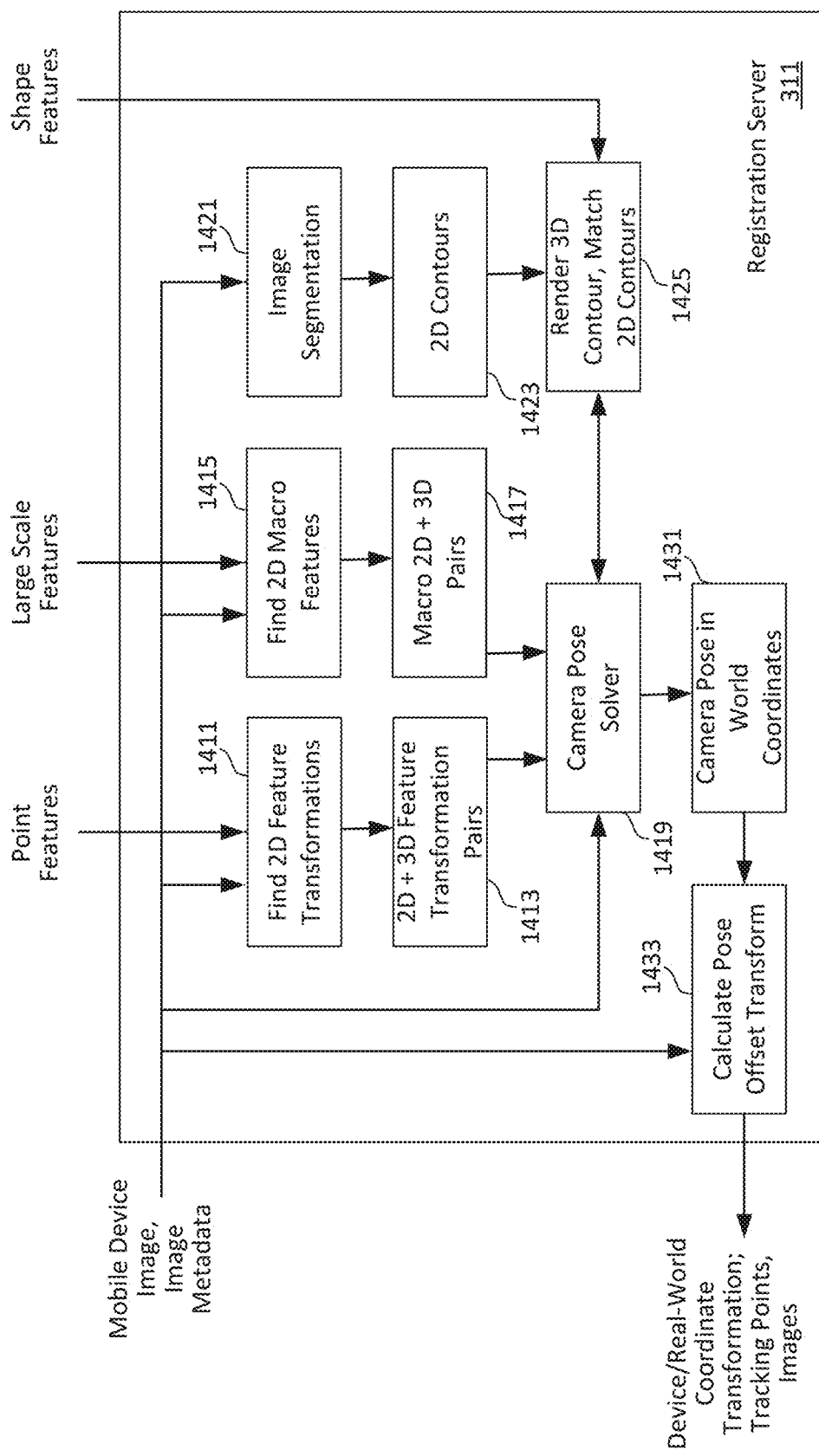
FIG. 14A is a block diagram of an embodiment for the registration/content server.

FIG. 14A is a more detailed flowchart of an embodiment for the operation of registration server 311. The registration server 311 retrieves the output of the three columns from registration processing 307 from the feature database 309 and combines these with the image data and metadata from a mobile device 321 to determine the transformation between the mobile device's coordinate system and the real world coordinate system. In terms of FIG. 4, the inputs (image data and image metadata from the mobile devices 321 and point features, large scale features, and shape features from the feature database 309) can be received through the network interfaces 450 and the outputs (the coordinate transformations and tracking points and template images) transmitted to the mobile device 321 by the network interfaces 450. The processing steps of FIG. 14A (e.g., 1411, 1415, 1419, 1421, 1425, 1433) can be performed by the microprocessor 410, with the resultant data (e.g., 1413, 1417, 1423, 1431) stored in the memory 420 or mass storage 430, depending on how the microprocessor stores it for subsequent access.

The point features from the database 309, such as in the form a descriptor and 3D real world coordinates in the form of scale invariant feature transformation (SIFT) features, and the mobile device image data and image metadata are supplied to processing block 1411 to determine 2D feature transformations, with the resultant output data of 2D and 3D feature transformation pairs 1413, which can again be presented in a SIFT format. The processing of to find 2D macro features 1415 matches the mobile device's 2D image data to the 3D large scale features. To find the 2D macro features from the mobile device's image data, the inputs are the 2D image data and corresponding image metadata from the mobile device 321 and the large scale feature data (macro features and their 3D coordinate data) from the feature database 309. The processing to find 2D macro features 1415 from the mobile device's images can implemented as a convolutional neural network (CNN), for example, and generates matches as 2D plus 3D transformation pairs 1417 data for the large scale macro features of the venue.

For embodiments that use the 3D survey dataset, shape features extracted from the 3D survey data are combined with the image data and image metadata from the mobile device 321. The mobile device's image data and image metadata undergo image segmentation 1421 to generate 2D contours 1423 for the 2D images as output data. The image segmentation can be implemented on the registration server 311 as a convolutional neural network, for example. The 2D contour data 1423 can then be combined with the 3D contour data from the feature database 309 in processing to render the 3D contours to match the 2D contours within the images from the mobile device 321.

A camera pose solver 1419 generates the camera pose for mobile device 321 in real world coordinates 1431 as output data. The camera pose solver 1419 input data are the image data and image data from the mobile device 321, the 2D plus 3D feature transformation pairs 1413 data, and the macro 2D plus 3D transformation pairs 1417 data. The camera pose solver 1419 can also interact with the rendering of 3D contours and matching with 2D contour processing 1425. Based on these inputs, the output data is the camera pose of mobile device 321 in the real world coordinates 1431, which are then used to determine the transform so that the mobile device 321 can align its coordinate system to real world. The processing to calculate the pose offset transform 1433 uses the camera pose in real world coordinates 1431 and the image data and image metadata from mobile device 321. The device to real world coordinate transform can be a matrix of parameters for a translation to align the origins of the two coordinate systems, a rotation to align the coordinate axes, and a dilation, or scale factor, as distances may be measured differently in the two coordinate systems (e.g., meters in the mobile device 321 whereas measurement for a venue are given in feet). The device to real world coordinate transform can then be sent from the registration server 311 to the mobile device 321 along a set of tracking points and template images. Although described in terms of a single mobile device 321, this process can be performed concurrently for multiple mobile devices by the registration server.

Figure 14B:
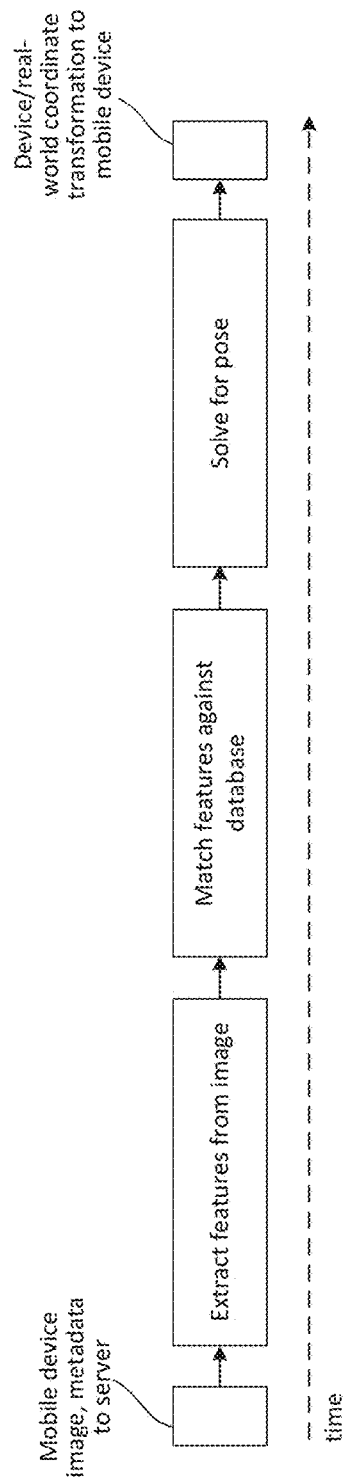
FIGS. 14B-14D illustrate embodiments for the timing of the different parts of the registration process.
Figure 14C:
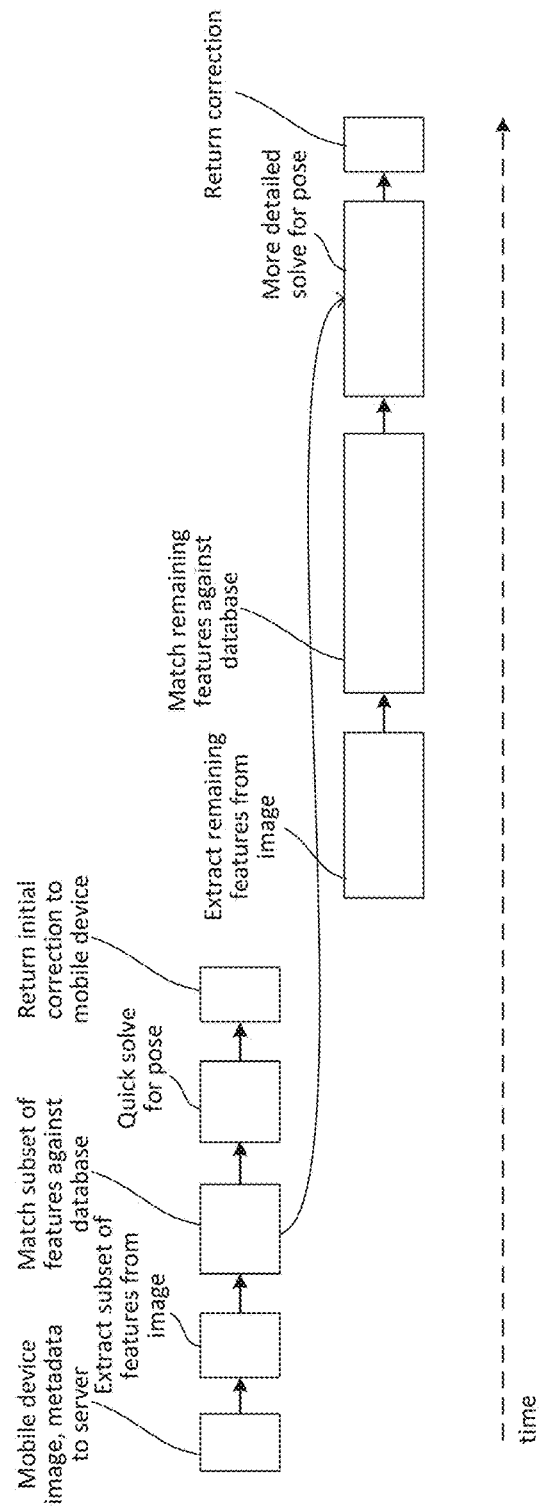
Figure 14D:
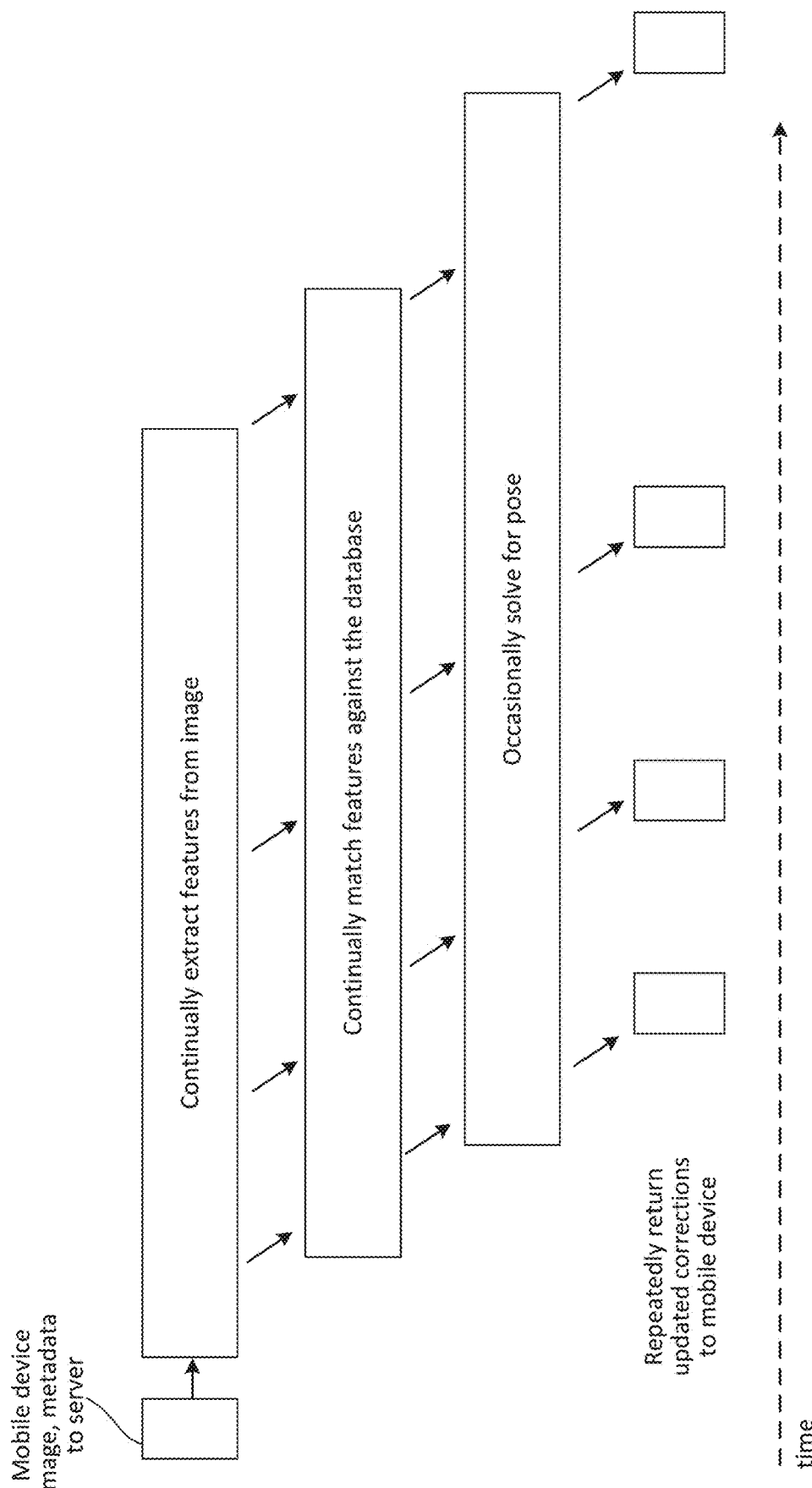

FIGS. 14B-14D illustrate implementations for the registration of a mobile augmented reality device 321 with a central registration server or servers 311. In the embodiment of FIG. 14A, the implementation sequentially performs each of the elements the registration process where the mobile device 321 sends image data and image metadata to a central registration server 311, extracts features from the images data, matches features against the feature database, solves for the pose of the mobile device 321, and sends a device/real world coordinate transformation (either for an initial transformation to align the coordinate systems or to correct/update the transformation) back to the device. As the speed of the response of the registration server 311 can be a factor in a positive user experience, alternate implementations can be used to provide a quicker response time, such as the quick/detailed implementation of FIG. 14C or the pipelined approach of FIG. 14D. The presentation of FIGS. 14B-14D present the process in terms of three steps (extract features, match features, and solve for pose), it will be understood that alternate embodiments can use additional or different steps.

In the approach of FIG. 14C, an initial correction is returned to the mobile device 321 followed by a more detail solution for solving the mobile device's pose. As represented in FIG. 14C, the determination and return of an initial correction is shown in the upper sequence, with the more detailed solution in the lower sequence. The upper sequence is similar to FIG. 14B and begins with the mobile device 321 sending image data and image metadata to the registration sever 311, but now only a subset of features is extracted from the image data by the registration server 311. As the number of extracted features is reduced, the determination of an initial correction can be performed more quickly than for the full process of FIG. 14B. After the subset of features are extracted, the subset is matched against the feature database 309 to determine a quick solve for the mobile device's pose, with this initial correction then sent from the registration server 311 to the mobile device 321. The mobile device can then begin an initial alignment of coordinate systems based on the initial correction data. To provide a more detailed solve for the pose of the mobile device 321, the registration server 311 extracts the remaining features from the image data, matches these against the feature database 309, and then can refine the quick solve to generate a more detailed solve for the pose of the mobile device 321. The more detailed correction can then be used by the mobile device 321 to refine the quick result. Although FIG. 14C illustrates the rough solution being determined and sent prior to starting the full registration process, in some embodiments these can overlap, such as beginning to extract the remaining features while the subset of features is being matched against the database.

FIG. 14D illustrates an extension of the process of FIG. 14C to a pipelined approach, incrementally returning better results as the registration server 311 repeatedly extracts features from the image data, matches each set of extracted features against the feature database 309, repeatedly solves for the pose of the mobile device 321, and returns the updated corrections to the mobile device 321 from the registration server 311. How many features that are found and matched by the registration server 311 before solving and returning an initial solution to the mobile device 321 can be a tunable parameter, as can also be the solution accuracy requirements. For example, the system can adjust the thresholds for the number of features found, matched, and included in the pose solution before returning a solution based on the system's load to adapt to the number of devices undergoing the registration process. The approach of FIGS. 14C and 14D provide an early or partial result that may be of lower accuracy than that of FIG. 14, but still be sufficient to start operating without the user wait that would result in waiting for the full quality result of the arrangement of FIG. 14B.

Figure 15:
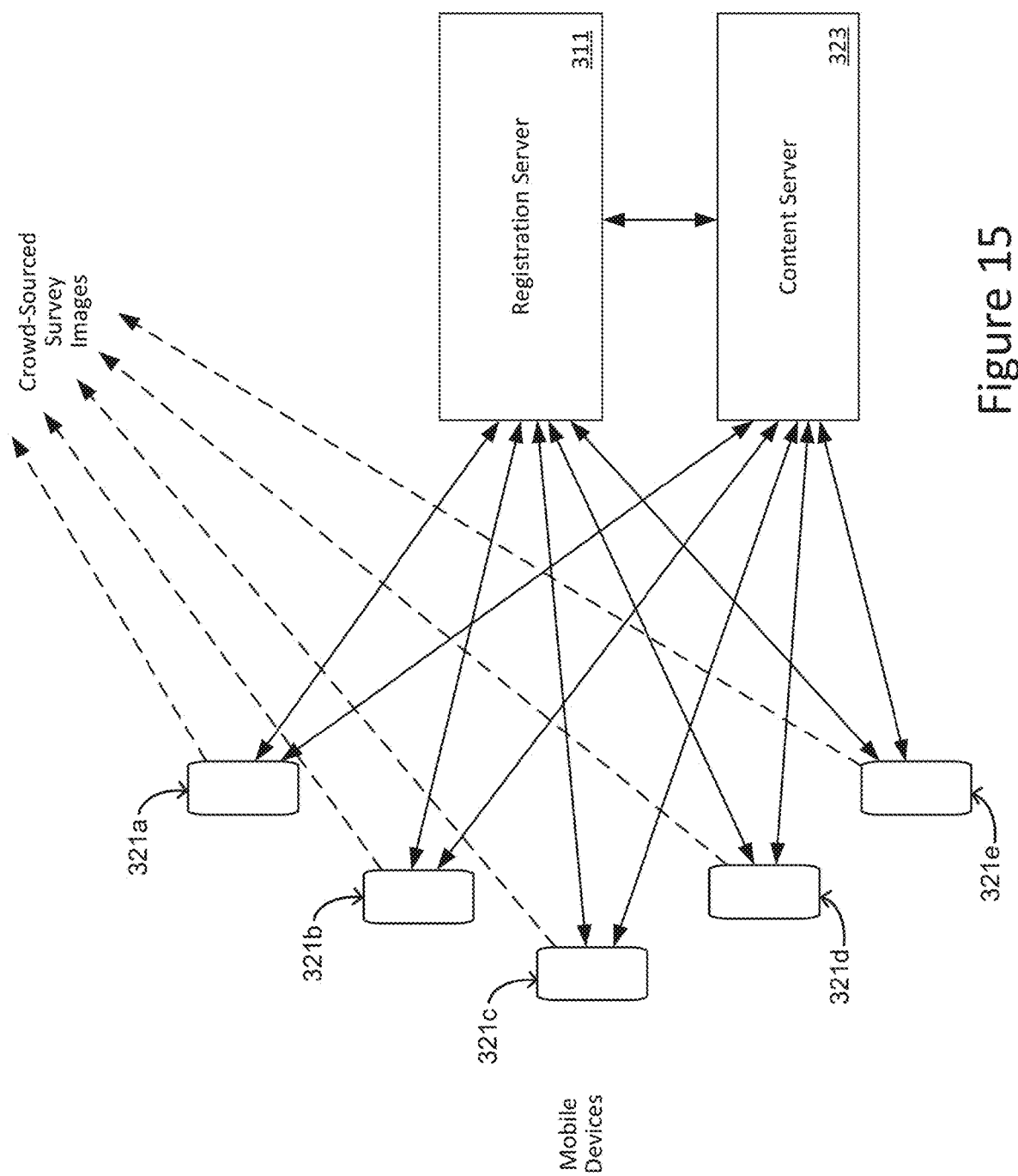
FIG. 15 illustrates the use of multiple mobile devices with the registration server and content server.

FIG. 15 illustrates the use of multiple mobile devices 321a, 321b, 321c, 321d, and 321e with the registration server 311 and content server 323 The example of FIG. 15 shows five mobile devices, but the number can range from a single device to large numbers of such devices used by viewers at an event venue. The mobile device can be of the same type or of different types (smart phone, tablet, or AR headset, for example). Each of the mobile devices 321a, 321b, 321c, 321d, and 321e can independently supply the registration server 311 with image data and image metadata as described above for a single mobile device 321. The registration server 311 can concurrently and independently perform the registration process for each of the mobile devices, providing them with their corresponding transformation between the mobile device's coordinate system and the real world coordinate system and with their own set of tracking points and reference images. Each of the mobile devices 321a, 321b, 321c, 321d, and 321e can independently request and receive 3D graphics and other content from the content server 323. Although FIG. 15 represent the registration server 311 and content server 323 as separate blocks, in an actual implementation each of these can correspond to one or more servers and parts or all of their functions can be combined within a single server.

In some embodiments some or all of the mobile devices 321a, 321b, 321c, 321d, and 321e can provide crowd-sourced survey images that can be used by registration processing 307 to supplement or, in some cases, replace the survey images from a survey camera rig 301. Depending on the embodiment, the crowd-sourced survey images can be one or both of the image data and image metadata supplied as part of the registration process or image data and image data generated in response to prompts from the system. The crowd-sourced survey images can be provided before or during an event. In some cases, such as extended outdoor venue (a golf course or route for a cycling race), there may be activity at the location of some viewers but not others, so that some of the crowd-sourced survey images could be used for assembling the feature database 309 relevant to a location prior to activity at the location, while other crowd-sourced survey images or other data would be relevant to locations of current activity.

Once a mobile device 321 has been registered, it can receive 3D graphics and other content for display on the mobile device. FIGS. 1 and 2 include some example of such content, with FIG. 16 presenting a block diagram of the distribution of content to user's mobile devices.

Figure 16:
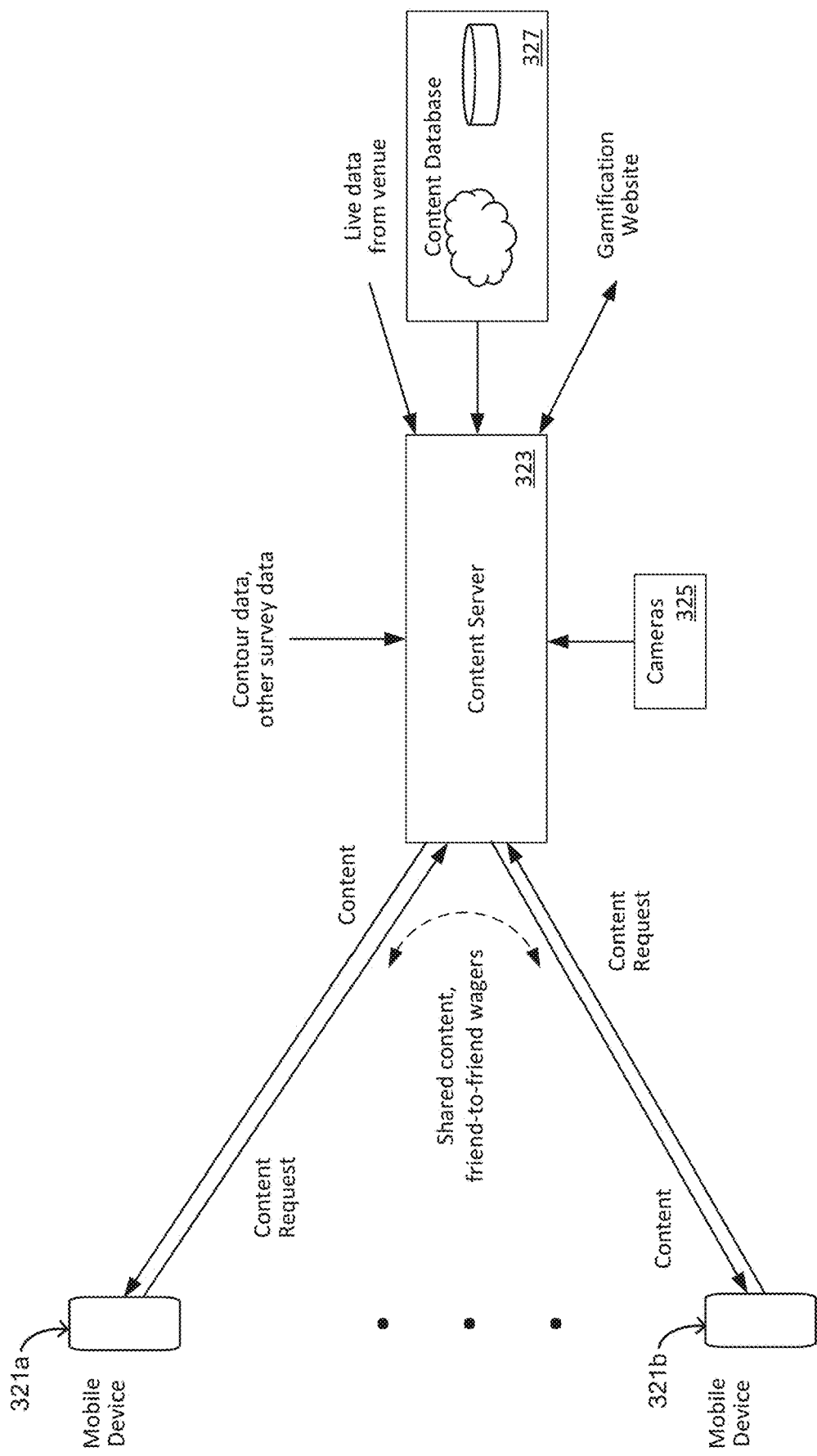
FIG. 16 is a block diagram of an embodiment for supplying content to one or more user's mobile devices.

FIG. 16 is a block diagram of an embodiment for supplying content to one or more user's mobile devices. FIG. 16 explicitly represents two such mobile devices, 321a and 321b, but at an actual event there could be large numbers of such mobile devices at a venue. The mobile devices 321a and 321b request and receive content from the content server 323. Although the specifics will vary depending on the venue and the type of event, FIG. 16 illustrates some examples of content sources, where some examples of content were described above with respect to FIGS. 1 and 2.

A content database 327 can be used to supply the content server 323 with information such as 3D graphics and other information that can be determined prior to an event, such as player information, elevation contours, physical distances, and other data that can be determined prior to event. Some of this content, such as 3D contours may also be provided from the registration server and the feature database 309. The content server 323 may also receive live data from the venue to provide as viewer content on things such as player positions, ball positions and trajectories, current venue conditions (temperature, wind speed), and other current information on the event so that live, dynamic event data visualization can be synchronized to the playing surface live action. One or more video cameras 325 at the venue can also provide streamed video content to the mobile devices 321a and 321b: for example, in some embodiments if a user of a mobile device requests a zoomed view or has there is subject to occlusions, the cameras 325 can provide a zoomed view or fill in the blocked view.

For some embodiments, the different mobile devices 321a and 321b can also exchange content as mediated by the content server 323. For example, the viewers can capture and share content (amplified moments such as watermarked photos) or engage in friend-to-friend betting or other gamification. The viewer can also use the mobile device 321a or 321b to send gamification related requests (such as placing bets on various aspects of the event, success of a shot, final scores, and so on) and responses from the content server 323 to the internet, such as for institutional betting or play for fun applications.

Figure 17:
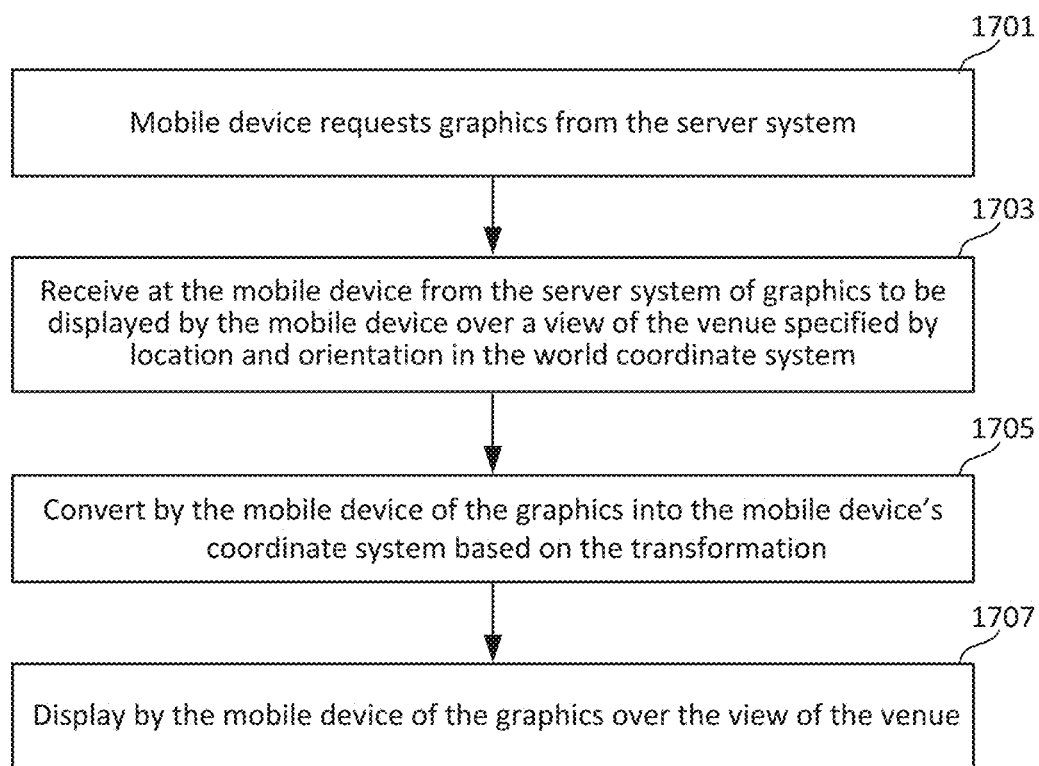
FIG. 17 is a flowchart for one embodiment of a process for requesting and receiving graphics by a registered mobile device.

FIG. 17 is a flowchart describing one embodiment of a process for requesting and receiving graphics by a registered mobile device 321, providing more detail for step 611 of FIG. 6. At step 1701 the registered mobile devices 321a, 321b, 321c, 321d, 321e of FIG. 15 request graphics content from content server 323. (The mobile devices 321a, 321b, 321c, 321d, 321e will have already received the transformation between the mobile device's coordinate system and the real world coordinate system from the registration server 311.) The requests for graphics at step 1701 can be based both on direct user input and on automatic requests by a mobile device 321. For example, as the mobile device has its field of view changed, new graphics can be requested based on the corresponding change in pose, in which case the mobile device can automatically issue a request for graphs appropriate to the new view of the venue. The graphics can also be used based on what is occurring in the view, such as when one set of players in a golf tournament finish a hole and a new set of players start the hole. User input to select graphics can be selected through the display of the mobile device 321, such as by the touch screen of a smart phone or laptop computer, or by pointing within the field of view of the camera for the mobile device. For example, a viewer may indicate a player's position within the view to request graphics of information on the player.

In step 1703, mobile devices 321a, 321b, 321c, 321d, 321e receive from content server 323 their respective graphics to be displayed by the mobile devices 321a, 321b, 321c, 321d, 321e over a view of the venue, where the graphics are specified by location and orientation in the real world coordinate system. Each of the mobile devices 321a, 321b, 321c, 321d, 321e can then use processor(s) 509 to convert the graphics into the mobile device's coordinate system based on the transformation at step 1705. The transformed graphics are then presented over a view of the venue by display 503 at step 1707.

The discussion to the point has focused on embodiments of augmented reality system using mobile devices, such as augmented reality enabled devices such as mobile phones, headsets, or glasses that are used to enhance a viewer's experience at an event's venue. The techniques can also be extended for use at remote locations, such as at home or a sport bar, for example, where the event is viewed on a television in conjunction with a smart television as part of "tabletop" embodiment.

Figure 18:
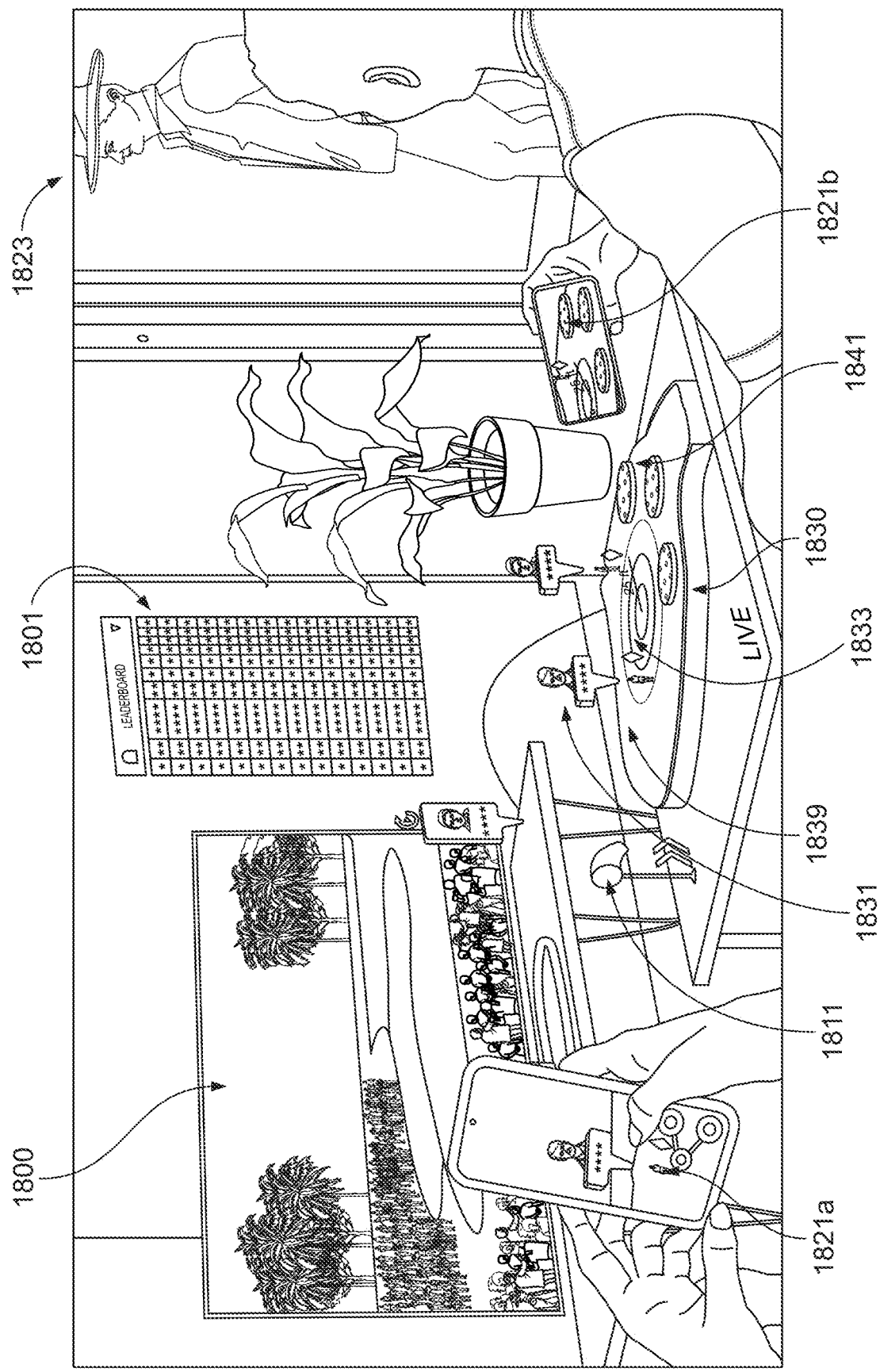
FIGS. 18 and 19 respectively illustrate examples of a tabletop embodiment for events at a golf course venue and a basketball venue, corresponding to the at-venue embodiments of FIGS. 1 and 2.
Figure 19:
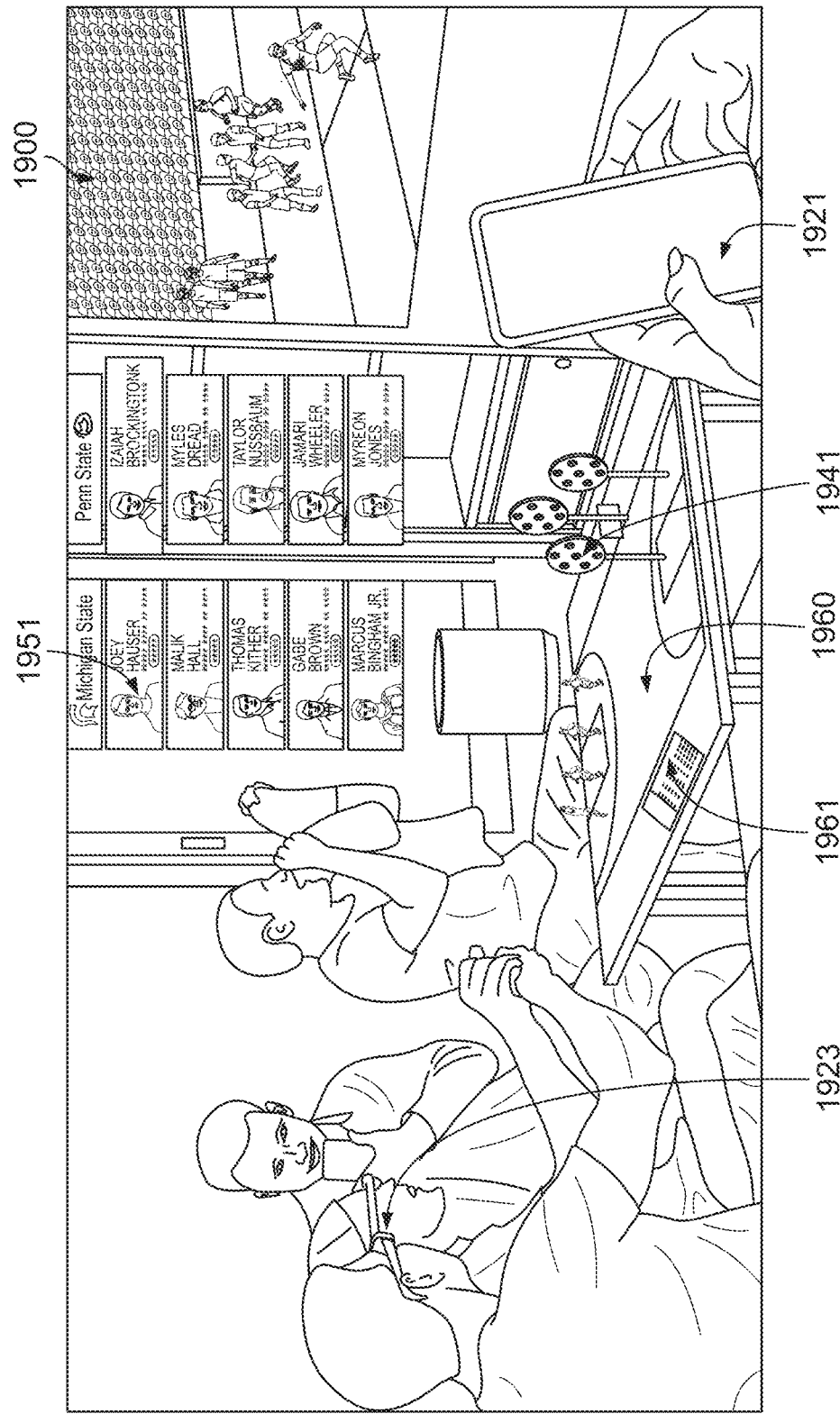

FIGS. 18 and 19 illustrate examples of a tabletop embodiment for respective events at a golf course venue and a basketball venue, corresponding to the at-venue embodiments of FIGS. 1 and 2. In a tabletop embodiment, in addition to being able to view the event on a television, the views can also view the event on mobile devices, such as a smart phone, with overlaid graphs and also to view graphics on a model of the venue with graphics.

FIG. 18 illustrates the same event and venue as FIG. 1, but viewed at a remote venue on a television 1800. The event can again be viewed on the display of a mobile device 1821a or 1821b with graphics and other AR content displayed along with the view of the event. A tabletop view 1830, similar to the zoomed view 130 of a model of the view in FIG. 1 can also be viewed by a head mounted display 1823. The augmented view can also present content, such as player statistics 1801 or course conditions such as the wind indication graphic 1811.

The tabletop view 1830 can include the graphics as described above for the in-venue view, both on the mobile device 121 and also in the zoomed view 130 of FIG. 1. Some examples include player info and ball location 1831, concentric distances to the holes 1833, and a contour grid 1839, as well as gamification graphics such as wager markers 1841.

FIG. 19 illustrates the same event and venue as FIG. 2, but viewed at a remote venue on a television 1900. A viewer can again view the event with augmented reality graphics on a mobile device 1921 with a display screen, the same as those presented above for in-venue viewing, or as a tabletop view 1830 presentation when viewed with an augmented reality head mounted display 1923. In the tabletop view 1960, the augmented reality content can again include content such as player statistics 1951 and 1961 described above with respect to FIG. 2, along with gamification graphics 1941.

Figure 20:
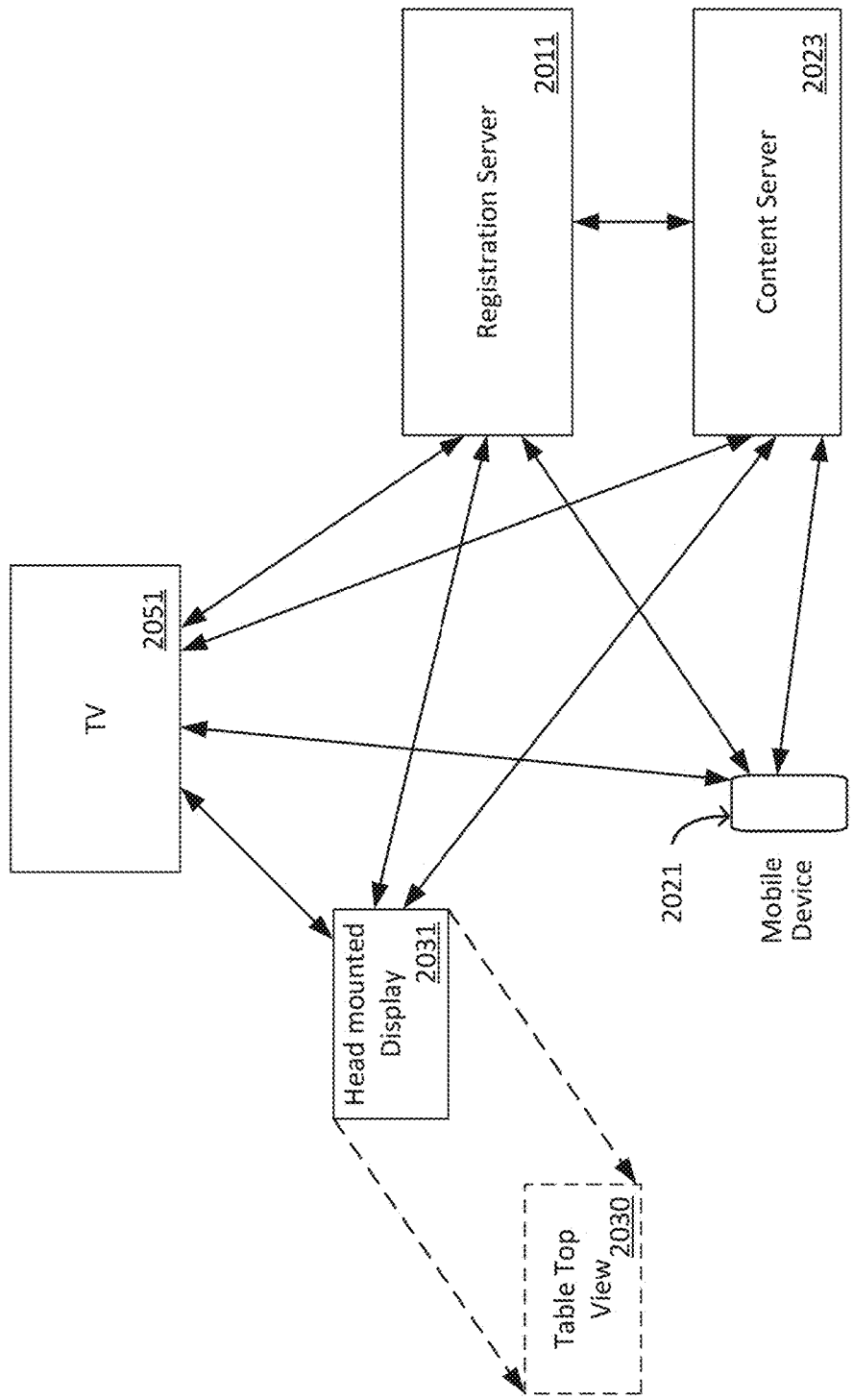
FIG. 20 is a bock diagram for a tabletop embodiment.

FIG. 20 is a block diagram of elements of a tabletop embodiment. Similar to FIG. 3, FIG. 20 again illustrates a registration server 2011 and a content server 2023, along with a mobile device 2021 such as a smart phone or other mobile device with a screen display. These elements can operate much as described above for the corresponding elements of FIG. 3 and other figures, but where the other elements of FIG. 3 are not explicitly shown in FIG. 20.

FIG. 20 also includes a television 2051 for remote viewing of the event, where the television may be connected to receive content from one or both of the registration server 2011 and content server 2023, receive content by another channel (cable or internet, for example), or a combination of these. The mobile device 321 may also interact with the television 2051 to receive content or transmit control signals, such as to change views or request content. FIG. 20 further includes a head mounted display 2031 such as an AR headset or AR glasses. The display of the head mounted display 2031 can display the tabletop view 2030, along with AR graphics.

Figure 21:
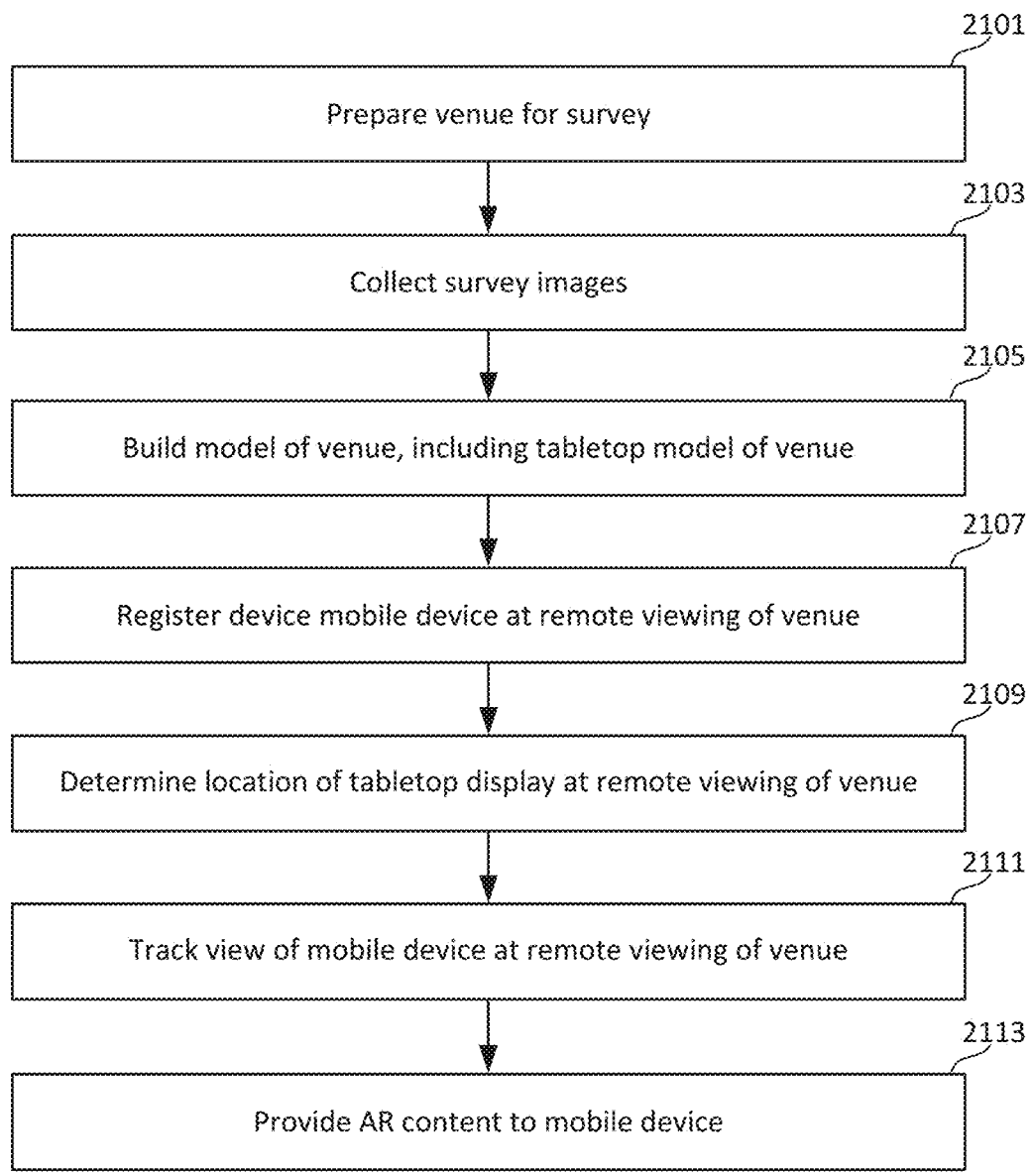
FIG. 21 is flowchart for the operation of tabletop embodiment.

FIG. 21 is flowchart for the operation of tabletop embodiment. As with the in-venue flow of FIG. 6, prior to an event a model of the venue is built. At step 2101 the venue is prepared for survey, with the survey images collected at step 2103. Steps 2101 and 2103 can be as described above with respect to steps 601 and 603 and can be the same as these steps, with the process for in-venue enhanced viewing and the process for remote viewing being the same process. At step 2105 a tabletop model of the venue is built in much the same way as described with respect to step 605, but additional the model of the venue is built for a tabletop display. In the tabletop view such as 1830 or 1960, rather than being display over a view of the venue as viewed through a head mounted display of the mobile device or on the display of the mobile device, at a tabletop position at the remote venue a representation of the venue is also presented, with the AR graphics presented over the representation. When viewed with an augmented reality head mounted display 1823 or 1923, the venue representation with graphics is displayed at a designed location (i.e., a tabletop) within the remote venue.

At step 2108 the mobile devices 1821/1921 and 1823/1923 are register similarly to step 607 of FIG. 6, but now the position of where the tabletop view 1830/1960 is to be located by the head mounted displays is also determined. This position can be determined by input from the views of the head mounted displays 1823/1923 within venue at step 2109. Although the movements at a remote venue will often be more limited than for in-venue viewing, tracking (similar to step 609) is performed at step 2111, both to accurately display the graphics, but also to maintain the laptop model in its location. At step 2113, requested graphics are again provided to the views on their mobile devices.

According to one set of aspects, a method includes receiving from each of a plurality of mobile devices image data and image metadata, the image metadata including information on the mobile device's location and orientation within a venue for an event in the mobile device's coordinate system and retrieving, from one or more databases, point features of the venue in a first coordinate system and locations of a set of fiducials features for the venue in a real world coordinate system. The method further includes building of a model of the venue in the real world coordinate system from the point features of the venue and the locations of the set of fiducials features in the real world coordinate system and generating for each of the mobile devices a corresponding transformation between the mobile device's coordinate system and the real world coordinate system from the image data and image metadata from each of the mobile devices and the model of the venue in the real world coordinate system. Additionally, the method includes: transmitting to each of the mobile devices the corresponding transformation between the mobile device's coordinate system and the real world coordinate system; receiving from each to the mobile devices receiving requests for content including graphics to be displayed by the mobile device over a view of the venue as specified by location and orientation in the real world coordinate system; and transmitting to each of the mobile devices the requested content.

In other aspects, a system includes a registration server configured to access data from one or more databases and to receive data from and transmit data to a plurality of mobile devices and a content server configured to receive data from and transmit data to the plurality of mobile devices. The registration server is also configured to: retrieve point features of a venue for an event in a first coordinate system and locations of a set of fiducials features for the venue in a real world coordinate system from the one or more databases; for each of the mobile devices, receive image data and image metadata, the image metadata including information on the mobile device's location and orientation within the venue in the mobile device's coordinate system; from the point features of the venue and the locations of the set of fiducials features in the world coordinate system, build a model of the venue in the real world coordinate system; from the image data and image metadata from each of the mobile devices and the model of the venue in the real world coordinate system, generate for each of the mobile devices a corresponding transformation between the mobile device's coordinate system and the real world coordinate system; and transmit to each of the mobile devices the corresponding transformation between the mobile device's coordinate system and the real world coordinate system. The content server is configured to: for each of the mobile devices, receive requests for graphics to be displayed by the mobile device over a view of the venue as specified by location and orientation in the real world coordinate system; and transmit to each of the mobile devices the requested graphics.

Aspects also include a method, comprising: transmitting, from a mobile device to a server system, image data of a venue and image metadata, the image metadata including location information and orientation for the image data in the mobile device's coordinate system; in response to transmitting the image data and image metadata, receiving at the mobile device a transformation between the mobile device's coordinate system and the real world coordinate system from the server system; transmitting, from the mobile device to the server system, requests for graphics to be displayed by the mobile device over a view of the venue as specified by location and orientation in the real world coordinate system; receiving at the mobile device the requested graphics from the server system; and displaying by the mobile device of the requested graphs over the view of the venue.

Additional aspects include a method that comprises: retrieving by a server from one or more databases point features of a venue for an event in a first coordinate system; retrieving by the server from the one or more databases locations of a set of fiducials features for the venue in a real world coordinate system; receiving by the server of image data and image metadata from a mobile device, the image metadata including information on the mobile device's location and orientation within the venue in a coordinate system of the mobile device; generating by the server of a transformation between the mobile device's coordinate system and the real world coordinate system from the image data and image metadata from the mobile device and from the point features of the venue and the locations of the set of fiducials features in the real world coordinate system; generating by the server for the mobile device a set of template images and a set of tracking points within each of the template images configured to allow the mobile device to track an accuracy of the transformation between the mobile device's coordinate system and the real world coordinate system from the image data and from the point features of the venue; transmitting from the server to the mobile device the transformation between the mobile device's coordinate system and the real world coordinate system; and transmitting from the server to the mobile device the set of template images and the set of tracking points within each of the template images.

More aspects include a system of one or more servers configured to access data from one or more databases, to receive data from and transmit data to a mobile device. The one or more servers are also configured to: retrieve, from the one or more databases, point features of a venue for an event in a first coordinate system and locations of a set of fiducials features for the venue in a real world coordinate system; receive image data and image metadata from the mobile device, the image metadata including information on mobile device's location and orientation within the venue in a coordinate system of the mobile device; from the image data and image metadata from the mobile device and from the point features of the venue and the locations of the set of fiducials features in the real world coordinate system, generate a transformation between the mobile device's coordinate system and the real world coordinate system; from the image data and from the point features of the venue, generate for the mobile device a set of template images and a set of tracking points within each of the template images configured to allow the mobile device to track accuracy of the transformation between the mobile device's coordinate system and the real world coordinate system; transmit to the mobile device the transformation between the mobile device's coordinate system and the real world coordinate system; and transmit to the mobile device the set of template images and the set of tracking points within each of the template images.

Aspects also include a method that comprises: generating image data by a mobile device; generating by the mobile device of image metadata for the image data in a coordinate system for mobile device; transmitting by the mobile device of the image data and the image metadata to one or more servers; subsequent to transmitting the image data and the image metadata, receiving by the mobile device from the one or more servers a transformation between the mobile device's coordinate system and the real world coordinate system and graphics to be displayed by the mobile device over a view of a venue as specified by location and orientation in the real world coordinate system; converting by the mobile device of the graphics into the mobile device's coordinate system based on the transformation between the mobile device's coordinate system and the real world coordinate system; and presenting by the mobile device of the graphics over the view of the venue.

Other aspects include a method that includes: generating by a mobile device of image data of a venue and image metadata for the image in a coordinate system for the mobile device; providing image data of the venue and image metadata from the mobile device to a server system; generating by the server system of a transformation between the mobile device's coordinate system and the real world coordinate system from the image data and image metadata; transmitting the transformation between the mobile device's coordinate system and the real world coordinate system from the server system to the mobile device; receiving at the mobile device from the server system of graphics to be displayed by the mobile device over a view of the venue; converting by the mobile device of the graphics into the mobile device's coordinate system based on the transformation; and displaying by the mobile device of the graphics over the view of the venue.

Additional aspects include a system having a mobile device configured to: generate image data of a venue and image metadata for the image data in a coordinate system for the mobile device; receive a transformation between the mobile device's coordinate system and the real world coordinate system; receive graphics to be displayed by the mobile device over a view of the venue specified by location and orientation in the real world coordinate system; convert the graphics into a coordinate system of the mobile device based on the transformation between the mobile device's coordinate system and the real world coordinate system; and present the converted the graphics over the view of the venue. The system also includes one or more servers configured to exchange data with the mobile device and to: receive the image data of the venue and the image metadata; generate the transformation between the mobile device's coordinate system and the real world coordinate system from the image data and image metadata; provide the transformation between the mobile device's coordinate system and the real world coordinate system; and provide the graphics to be displayed over the view of the venue specified by location and orientation in the real world coordinate system.

In other aspects, a method includes: generating image data by a camera of a first mobile device; providing image metadata in a coordinate system for first mobile device for the image data by one or more sensors of the first mobile; transmitting the image data and the image metadata from the first mobile device to one or more servers; transmitting a request for graphics to be displayed by the first mobile device over a view of a venue from the first mobile device to one or more servers; receiving at the first mobile device from the one or more servers a transformation between a coordinate system the first mobile device and a real world coordinate system; receiving at the first mobile device from the one or more servers the requested graphics; converting by the first mobile device of the requested graphics into the first mobile device's coordinate system based on the transformation between the first mobile device's coordinate system and a real world coordinate system; and presenting the requested graphics over the view of the venue by the mobile device.

Additional aspects present a method that includes: receiving, at a server system from each of a plurality of mobile devices, corresponding image data of a venue for an event and corresponding image metadata, the image metadata including information about a location and an orientation of the corresponding mobile device within the venue in a coordinate system of the corresponding mobile device when capturing the image metadata; building by the server system of a model of the venue in a real world coordinate system from the image data and image metadata from the plurality of mobile devices; generating by the server system of a corresponding transformation between each of the mobile device's coordinate system and the real world coordinate system from the corresponding image data and image metadata of each of the mobile devices and the model of the venue in the real world coordinate system built from the image data and image metadata from the plurality of mobile devices; and transmitting from the server system to each of the mobile devices the corresponding transformation between the mobile device's coordinate system and the real world coordinate system.

More aspects include a system that includes one or more servers configured to access data from one or more databases, to receive data from and transmit data to a plurality of mobile devices. The one or more servers are also configured to: receive, from each of the mobile devices, image data of a venue for an event and image metadata, the image metadata including information on a location and an orientation of the mobile device within the venue in a coordinate system of the mobile device when capturing the image metadata; build a model of the venue in the real world coordinate system from the image data of a venue for an event and image metadata from the plurality of mobile devices; from the image data and image metadata of each of the mobile devices and the model of the venue in the real world coordinate system, generate for each of the mobile devices a corresponding transformation between the mobile device's coordinate system and the real world coordinate system; transmit to each of the mobile devices the corresponding transformation between the mobile device's coordinate system and the real world coordinate system; for each of the mobile device, receive requests for graphics to be displayed by the mobile device over a view of the venue as specified by location and orientation in the real world coordinate system; and transmit to each of the mobile devices the requested graphics.

Further aspects present a method that includes: receiving, at a server system from each of a plurality of mobile devices, image data of a venue for an event and image metadata, the image metadata including information on a location and an orientation of the mobile device within the venue in a coordinate system of the mobile device when capturing the image metadata; retrieving point features of the venue in a first coordinate system and locations of a set of fiducials features for the venue in a world coordinate system by the server system from the one or more databases; building by the server system of a model of the venue in the world coordinate system from the point features of the venue in the first coordinate system, the locations of the set of fiducials features for the venue in the world coordinate system, and the image data of a venue for an event and image metadata from the plurality of mobile devices; generating by the server system of a corresponding transformation between the mobile device's coordinate system and the real world coordinate system for each of the mobile devices from the image data and image metadata of each of the mobile devices and the model of the venue in the world coordinate system; and transmitting from the server system to each of the mobile devices the corresponding transformation between the mobile device's coordinate system and the real world coordinate system.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

We claim:

1. A method, comprising:
   receiving image data and corresponding image metadata from each of a plurality of mobile devices at a venue, each of the mobile devices including a camera configured to generate the image data of the venue and a display configured to display a live view of the venue for an event and to display graphics over the view of the venue, and each of the mobile devices independently maintaining a corresponding internal coordinate system and the corresponding image metadata including information specifying a location and an orientation of the corresponding mobile device within the venue for the event in the internal coordinate system of the corresponding mobile device when capturing the image data;
   retrieving, from one or more databases, point features of the venue determined in a first coordinate system;
   retrieving, from the one or more databases, locations of a set of fiducials features for the venue in a real world coordinate system, the location of each of the set of fiducial features being at corresponding point of the venue in the real world coordinate system as determined in a survey of the venue;
   determining, from the set of fiducials features for the venue in a real world coordinate system and the point features of the venue determined in the first coordinate system, the point features of the venue in the real world coordinate system;
   building of a model of the venue in the real world coordinate system from the point features of the venue and the locations of the set of fiducials features in the real world coordinate system, the model comprising a reference map including location data of a set reference features in the real world coordinate system;
   generating for each of the mobile devices a corresponding transformation between the mobile device's corresponding internal coordinate system and the real world coordinate system from the image data and corresponding image metadata from each of the mobile devices and the model of the venue in the real world coordinate system by:
      extracting a set of features from the image data from each of the mobile devices;
      comparing the set of features extracted from the image data from each of the mobile devices against the set of reference features in the real world coordinate system;

from comparing the set of features extracted from the image data from each of the mobile devices against the set of reference features in the real world coordinate system and from the location data of the set of reference features in the real world coordinate system, determining a corresponding location and orientation in the venue for each of the mobile devices in the real world coordinate system; and generating the corresponding transformation between each of the mobile device's corresponding internal coordinate system and the real world coordinate system from the corresponding location and orientation in the real world coordinate system and the corresponding image metadata including the location and an orientation in the mobile device's corresponding internal coordinate system;

transmitting to each of the mobile devices the corresponding coordinate transformation between the mobile device's corresponding internal coordinate system and the real world coordinate system;

receiving from each of the mobile devices corresponding requests for content including graphics to be displayed by the mobile device over the view of the venue as specified by location and orientation in the real world coordinate system;

transmitting to each of the mobile devices the corresponding requested content;

receiving, at each of the mobile devices, the corresponding requested content and the corresponding coordinate transformation;

displaying, by each of the mobile devices on the mobile device's display, the live view of the venue generated by the mobile device's camera; and displaying, by each of the mobile devices on the mobile device's display, the corresponding requested content displayed over and aligned with the live view by use of the corresponding coordinate transformation.

2. The method of claim 1, further comprising:
receiving survey images of the venue and a set of fiducial points for the venue in the real world coordinate system, one or more of the fiducial points being included in the survey images;
processing the survey images and the set of fiducial point to generate the point features of the venue and the locations of the set of fiducials features in the real world coordinate system; and
storing the point features of the venue and the locations of the set of fiducials features in the real world coordinate system in the one or more databases.

3. The method of claim 1, further comprising:
retrieving the requested content from the one or more databases.

4. The method of claim 1, further comprising:
receiving live content of the event from the venue; and
generating graphics to be displayed by the mobile devices over the view of the venue from the live content.

5. The method of claim 1, further comprising:
receiving live video of the event from the venue; and
transmitting to each of the mobile devices the live video in response to a request for content including the live video.

6. The method of claim 1, wherein the graphics to be displayed by the mobile device over a view of the venue include three dimensional contours of the venue to be displayed over a two dimensional view of the venue.

7. The method of claim 1, further comprising:
receiving a request from a first mobile device to supply specified content with specified graphics to a second mobile device; and
transmitting the specified content with specified graphics to the second mobile device.

8. The method of claim 7, wherein the specified content with specified graphics includes gamification content.

9. The method of claim 1, further comprising:
receiving from a first mobile device a gamification request;
transmitting the gamification to a gamification website;
receiving a response to the gamification request from the gamification website; and
transmitting the response to the first mobile device.

10. The method of claim 1, further comprising:
receiving live content of the event from the venue; and
transmitting graphics derived from the live content to the mobile devices.

11. The method of claim 1, further comprising:
receiving from a first mobile device a request to supply an alternate view of the venue; and
transmitting the alternate view to the first mobile device.

12. A system, comprising:
a registration server configured to access data from one or more databases, to receive data, including image data and corresponding image metadata, from and transmit data to a plurality of mobile devices at a venue, each of the mobile devices including a camera configured to generate the image data of the venue and a display configured to display a live view of the venue for an event and to display requested graphics over and aligned with the live view of the venue by use of a corresponding coordinate transformation between a corresponding internal coordinate system of the mobile device and a real word coordinate system of the venue, and each of the mobile devices independently maintaining the corresponding internal coordinate system and the corresponding image metadata including information specifying a location and an orientation of the corresponding mobile device within the venue for the event in the internal coordinate system of the corresponding mobile device when capturing the image data, and the registration server configured to:
retrieve point features of the venue determined in a first coordinate system;
retrieve locations of a set of fiducials features for the venue in a real world coordinate system from the one or more databases, the location of each of the set of fiducial features being at corresponding point of the venue in the real world coordinate system as determined in a survey of the venue;
determine, from the set of fiducials features for the venue in a real world coordinate system and the point features of the venue in the first coordinate system, the point features of the venue in the real world coordinate system;
receive, from each of the mobile devices, the image data and the corresponding image metadata;
from the point features of the venue and the locations of the set of fiducials features in the real world coordinate system, build a model of the venue in the real world coordinate system, the model comprising a reference map including location data of a set reference features in the real world coordinate system;

from the image data and corresponding image metadata from each of the mobile devices and the model of the venue in the real world coordinate system, generate for each of the mobile devices the corresponding transformation between the mobile device's corresponding internal coordinate system and the real world coordinate system; and transmit to each of the mobile devices the corresponding coordinate transformation between the mobile device's corresponding internal coordinate system and the real world coordinate system; and a content server configured to receive data from and transmit data to the plurality of mobile devices, the content server configured to:

for each of the mobile devices, receive corresponding requests for graphics to be displayed by the mobile device over a view of the venue as specified by location and orientation in the real world coordinate system; and transmit to each of the mobile devices the corresponding requested graphics.

13. The system of claim 12, wherein the requested graphics to be displayed by the mobile device over a view of the venue include three dimensional contours of the venue to be displayed over a two dimensional view of the venue.

14. The system of claim 12, wherein the content server is further configured to:

receive, from a first mobile device, a request to supply specified content with specified graphics to a second mobile device; and transmit the specified content with specified graphics to the second mobile device.

15. The system of claim 14, wherein the specified content with specified graphics includes gamification content.

16. The system of claim 12, wherein the content server is further configured to:

receive, from a first mobile device, a gamification request;

transmit the gamification request to a gamification website;

receive a response to the gamification request from the gamification website; and transmit the response to the first mobile device.

17. The system of claim 12, wherein the content server is further configured to:

receive live content of the event from the venue; and transmit graphics derived from the live content to the mobile devices.

18. The system of claim 12, wherein the content server is further configured to:

receive, from a first mobile device, a request to supply an alternate view of the venue; and transmit the alternate view to the first mobile device.

* * * * *

UNITED STATES PATENT AND TRADEMARK OFFICE
CERTIFICATE OF CORRECTION

| | |
|---|---|
| PATENT NO. | : 12,003,806 B2 |
| APPLICATION NO. | : 17/242265 |
| DATED | : June 4, 2024 |
| INVENTOR(S) | : Jayaram et al. |

It is certified that error appears in the above-identified patent and that said Letters Patent is hereby corrected as shown below:

In the Claims

Column 30, Line 41 (Claim 1, Line 20): After "corresponding" and before "of" delete "point" and replace with -- points --

Column 31, Lines 45-46 (Claim 2, Lines 6-7): After "fiducial" and before "to" delete "point" and replace with -- points --

Column 32, Line 51 (Claim 12, Line 27): After "corresponding" and before "of" delete "point" and replace with -- points --

Signed and Sealed this
Eighth Day of October, 2024

Katherine Kelly Vidal
*Director of the United States Patent and Trademark Office*